US012230113B2

(12) United States Patent
Timco

(10) Patent No.: US 12,230,113 B2
(45) Date of Patent: Feb. 18, 2025

(54) HUMAN CENTERED SAFETY SYSTEM USING PHYSIOLOGICAL INDICATORS TO IDENTIFY AND PREDICT POTENTIAL HAZARDS

(71) Applicant: IntelliSafe Analytics LLC, Moon Township, PA (US)

(72) Inventor: Daniel James Timco, McDonald, PA (US)

(73) Assignee: IntelliSafe Analytics LLC, Moon Township, PA (US)

( * ) Notice: Subject to any disclaimer, the term of this patent is extended or adjusted under 35 U.S.C. 154(b) by 28 days.

(21) Appl. No.: 18/108,213

(22) Filed: Feb. 10, 2023

(65) Prior Publication Data

US 2023/0260380 A1 Aug. 17, 2023

Related U.S. Application Data

(60) Provisional application No. 63/309,344, filed on Feb. 11, 2022.

(51) Int. Cl.
*G08B 21/02* (2006.01)

(52) U.S. Cl.
CPC .................................... *G08B 21/02* (2013.01)

(58) Field of Classification Search
CPC .... G08B 21/02; G08B 21/0446; G08B 21/06; G08B 21/14; G08B 21/043; G08B 21/0453; G08B 29/186
See application file for complete search history.

(56) References Cited

U.S. PATENT DOCUMENTS

| | | | |
|---|---|---|---|
| 2013/0013331 A1 | 1/2013 | Horseman | |
| 2015/0141772 A1 | 5/2015 | LeBoeuf et al. | |
| 2017/0109829 A1 | 4/2017 | Amigo et al. | |
| 2021/0174952 A1* | 6/2021 | Leong | H04Q 9/00 |
| 2021/0204195 A1 | 7/2021 | Crouthamel et al. | |
| 2021/0233654 A1 | 7/2021 | Arthur et al. | |
| 2021/0264346 A1* | 8/2021 | Momayez | G06F 18/2148 |
| 2021/0319894 A1 | 10/2021 | Sobol et al. | |

* cited by examiner

*Primary Examiner* — Omeed Alizada
(74) *Attorney, Agent, or Firm* — The Webb Law Firm

(57) ABSTRACT

Systems, methods, and computer program products for human-centered safety using physiological indicators to identify and/or predict potential hazards are disclosed. An example method includes receiving physiological data associated with a plurality of physiological parameters of a worker from a wearable device of the worker. The physiological data may be monitored to detect at least one potential hazard based on a hazard classifier. The hazard classifier may include at least one machine learning model trained based on historical physiological data associated with the plurality of physiological parameters. At least one communication may be communicated based on the potential hazard(s) and/or the physiological data.

19 Claims, 14 Drawing Sheets

200a

| | Fatigue | Distraction | Anger | Impairment | Unsafe Conditions | Unsafe Actions by Workers | Worker Health Issue | Harmful Substances or Gases |
|---|---|---|---|---|---|---|---|---|
| Transportation Incidents | X | X | X | X | X | X | X | |
| Trips, Slips & Falls | X | X | | X | X | X | X | X |
| Violence & Other Injuries Caused by Persons or Animals | | | X | X | | X | | |
| Contact With Objects and Equipment | | X | | X | X | X | | |
| Exposure to Harmful Substances or Environment | | | | | X | | | X |

FIG. 4A

PREVENTIVE

| Physiological Indicators | Heart Rate | Body Temperature | Blood Pressure | Galvanic Skin Response (sweat) | Cardiac Arrhythmia | Breathing Rate | Blood Oxygen Level | Gait |
|---|---|---|---|---|---|---|---|---|
| Fatigue | X | X | X | | X | X | X | X |
| Distraction | X | X | X | X | | X | X | |
| Anger | X | X | X | X | X | X | X | X |
| Impairment | X | X | X | X | X | X | X | X |
| Worker Health Issue | X | X | X | X | X | X | X | X |
| Harmful Substance or Gases | X | X | X | X | X | X | X | X |

CONTAINMENT

| Physiological Indicators | Heart Rate | Body Temperature | Blood Pressure | Galvanic Skin Response (sweat) | Cardiac Arrhythmia | Breathing Rate | Blood Oxygen Level | Gait |
|---|---|---|---|---|---|---|---|---|
| Injury | X | X | X | X | X | X | X | X |
| Unconsciousness | X | X | X | X | X | X | X | X |

FIG. 4B

| Physiological Changes | CO | Low O2 |
|---|---|---|
| Heart Rate | ↑ | ↑ ↓ |
| Body Temperature | – | ↓ |
| Blood Pressure | ↓ | ↑ ↓ |
| Galvanic Skin Response (sweat) | ↑ | ↑ |
| Cardiac Arrhythmia | ↑ | ↑ |
| Breathing Rate | ↑ | ↑ |
| Blood Oxygen Level | ↓ | ↓ |
| Gait | Unsteady | Unsteady |

FIG. 5A

HUMAN CENTERED SAFETY SYSTEM USING PHYSIOLOGICAL INDICATORS TO IDENTIFY AND PREDICT POTENTIAL HAZARDS

CROSS-REFERENCE TO RELATED APPLICATION

This application claims priority to U.S. Provisional Patent Application No. 63/309,344 filed Feb. 11, 2022, the disclosure of which is hereby incorporated by reference in its entirety.

BACKGROUND

1. Field

This disclosure relates generally to safety and identification and prediction of potential hazards and, in some non-limiting embodiments or aspects, to systems, methods, and computer program products for human-centered safety using physiological indicators to identify and/or predict potential hazards.

2. Technical Considerations

Workplace safety is important in many industries. For example, such industries may include construction, fire service, mining, oil and gas, utilities, manufacturing, healthcare, service/hospitality, and/or the like. Information to detect potential hazards in the workplace is often gained by using environmental or external detectors or monitors to alert people of the potential hazards in the environment.

However, environmental or external detectors or monitors only measure a person's surroundings. Not all hazardous situations can be detected by monitoring a person's environment. Additionally, such detectors or monitors are not specific to a specific person's physiology. Moreover, the output of such monitors or detectors is not based on a person's true health status.

There can also be problems with such monitors or detectors or with how they are used. For example, in certain circumstances, it may be difficult or impossible to verify someone is actually using the detector or monitor correctly. As another example, such detectors or monitors may not be functioning properly. Moreover, such detectors or monitors require frequent maintenance, calibration, and testing. Even if functioning properly, many different detectors or monitors that are each for specific hazards may be needed to fully protect a worker. As such, the work environment must be well known to select the right type of detector. Accordingly, such detectors or monitors are complicated to use, require maintenance, can be forgotten, and do not guarantee that the person is protected. Sometimes, many different detectors are needed to fully protect an individual.

Furthermore, certain safety products and/or systems focus on protection (e.g., personal protective equipment, such as hard hats, masks, respirators, protective eyewear, protective clothing, gloves, and/or the like) or monitoring of current conditions (e.g., relying on environmental or external detectors or monitors). However, such products and/or systems may be unable to predict and/or prevent future hazards. Moreover, data collection for current hazards, near misses, and other situations in the workplace frequently relies on manual entry of data (e.g., by the worker, safety personnel, and/or the like). As such, these products and/or systems rely on each individual's involvement and commitment to safety training, rely heavily on whether a company is rigorous with regular observations and recording, cannot observe every situation or hazard, are prone to human error, are not real-time, require interpretation and intervention from trained personnel, are awkward and annoying to employees, and/or reduce productivity and interrupt an employee's work-day.

SUMMARY

Accordingly, it is an object of the present disclosure to provide systems, methods, and computer program products for human-centered safety using physiological indicators to identify and/or predict potential hazards that overcome some or all of the deficiencies identified above.

According to non-limiting embodiments or aspects, provided is a method for human-centered safety using physiological indicators to detect at least one potential hazard. The method may include receiving, with at least one processor, physiological data associated with a plurality of physiological parameters of a worker from a wearable device of the worker. The method may include monitoring, with the at least one processor, the physiological data to detect at least one potential hazard based on a hazard classifier. The hazard classifier may include at least one machine learning model trained based on historical physiological data associated with the plurality of physiological parameters. The method may include communicating, with the at least one processor, at least one communication based on the at least one potential hazard.

In some non-limiting embodiments or aspects, the plurality of physiological parameters may include at least one of heart rate, body temperature, blood pressure, galvanic skin response, cardiac arrhythmia, breathing rate, blood oxygen level, gait, motion, body motion, limb motion, sounds, vibrations, a measurable quantity from the body of the worker, or any combination thereof.

In some non-limiting embodiments or aspects, the physiological data may include at least one of accelerometer data, blood volume pulse data, electrodermal activity data, body temperature data, gyroscope data, heart rate data, blood pressure data, galvanic skin response data, cardiac arrhythmia data, breathing rate data, blood oxygen level data, gait data, acoustic data, vibration data, sound data, motion data, body motion data, limb motion data, or any combination thereof.

In some non-limiting embodiments or aspects, the wearable device may include a plurality of sensors associated with the plurality of physiological parameters.

In some non-limiting embodiments or aspects, the plurality of sensors may include at least one of an accelerometer, a blood volume pulse sensor, an electrodermal activity sensor, a body temperature sensor, a gyroscope, a heart rate sensor, a blood pressure sensor, a galvanic skin response sensor, a cardiac arrhythmia sensor, a breathing rate sensor, a blood oxygen level sensor, a gait sensor, an acoustic sensor, a vibration sensor, a microphone, a motion sensor, or any combination thereof.

In some non-limiting embodiments or aspects, the physiological data may include raw sensor data from the plurality of sensors.

In some non-limiting embodiments or aspects, the at least one machine learning model may include at least one of a random forest model, a decision tree model, a neural network, a recurrent neural network, a long short-term memory model, an autoregressive integrated moving average, or any combination thereof.

In some non-limiting embodiments or aspects, the hazard classifier may include a plurality of machine learning models, each machine learning model of the plurality of machine learning models associated with a respective potential hazard of a plurality of potential hazards.

In some non-limiting embodiments or aspects, the at least one potential hazard may include at least one of a slip, a trip, a fall, heat stress, impairment, a hazardous substance, a hazardous environment, a distraction, violence, fatigue, contact with at least one object, a driving accident, a lack of oxygen, or any combination thereof.

In some non-limiting embodiments or aspects, the at least one potential hazard may include at least one of a current hazard, a future hazard, or any combination thereof.

In some non-limiting embodiments or aspects, the wearable device may include at least one of a wrist-wearable device, a torso-wearable device, a garment configured to be worn by the worker, or any combination thereof.

In some non-limiting embodiments or aspects, communicating the at least one communication may include at least one of displaying an alert message to the worker, playing an audible alert message to the worker, generating a haptic alert, displaying a prompt to the worker, communicating at least one message to a remote computer system, communicating at least one message to a safety personnel computing device, or any combination thereof.

In some non-limiting embodiments or aspects, the at least one processor may include at least one remote computer system processor of a remote computer system remote from the worker. Communicating the at least one communication may include communicating an alert message to at least one of the wearable device, a safety personnel computing device, or any combination thereof.

In some non-limiting embodiments or aspects, the at least one processor may include at least one mobile device processor of a mobile device proximate to the worker. The method further may include communicating, with the at least one mobile device processor, the physiological data to a remote computer system.

In some non-limiting embodiments or aspects, the method further may include receiving, with the remote computer system, the historical physiological data; training, with the remote computer system, the at least one machine learning model of the hazard classifier based on the historical physiological data; and communicating, with the remote computer system, the trained hazard classifier to the mobile device.

In some non-limiting embodiments or aspects, the method further may include receiving, with the remote computer system, the physiological data.

In some non-limiting embodiments or aspects, the method further may include retraining, with the remote computer system, the at least one machine learning model of the hazard classifier based on the physiological data.

In some non-limiting embodiments or aspects, the method further may include communicating, with the remote computer system, the retrained hazard classifier to the mobile device.

In some non-limiting embodiments or aspects, the method further may include communicating, with the remote computer system, at least one further communication to a safety personnel computing device based on receiving the physiological data.

In some non-limiting embodiments or aspects, the method further may include displaying, with the safety personnel computing device, at least one graphical user interface based on the at least one further communication.

In some non-limiting embodiments or aspects, displaying the at least one graphical user interface may include at least one of displaying an alert message, displaying location data associated with the at least one potential hazard, displaying at least one dashboard, or any combination thereof.

In some non-limiting embodiments or aspects, the at least one dashboard may include at least one of at least one gauge graphical element, at least one bar graphical element, or any combination thereof.

In some non-limiting embodiments or aspects, the at least one gauge graphical element may include a plurality of gauge graphical elements, which may include a first gauge graphical element associated with inherent risk of the at least one potential hazard, a second gauge graphical element associated with current risk of the at least one potential hazard, and a third gauge graphical element associated with future risk of the at least one potential hazard.

In some non-limiting embodiments or aspects, the at least one bar graphical element may include a plurality of bar graphical elements, which may include a first subset of bar graphical elements associated with worker data of the worker, a second subset of bar graphical elements associated with at least one current potential hazard of the at least one potential hazard, and a third subset of bar graphical elements associated with at least one future potential hazard of the at least one potential hazard.

In some non-limiting embodiments or aspects, monitoring the physiological data to detect the at least one potential hazard based on the hazard classifier may include inputting the physiological data to the hazard classifier to generate at least one prediction associated with the at least one potential hazard.

In some non-limiting embodiments or aspects, the method further may include determining a risk level based on the at least one potential hazard, wherein communicating the at least one communication may include communicating the at least one communication based on the risk level.

In some non-limiting embodiments or aspects, the risk level may include a risk level category of a plurality of risk level categories. The plurality of risk level categories may include at least one of an individual risk level category, a department risk level category, a location risk level category, a mid-level risk level category, a corporate risk level category, or any combination thereof.

In some non-limiting embodiments or aspects, the hazard classifier may be calibrated based on worker data of the worker.

In some non-limiting embodiments or aspects, the worker data of the worker may include at least one of age, height, weight, body mass index, gender, gait, fitness level, fear of heights, rushing tendency, experience level, experience time, or any combination thereof.

According to non-limiting embodiments or aspects, provided is a system for human-centered safety using physiological indicators to detect at least one potential hazard. The system may include at least one processor and at least one non-transitory computer-readable medium, which may include one or more instructions. When executed by the at least one processor, the one or more instructions may cause the at least one processor to receive physiological data associated with a plurality of physiological parameters of a worker from a wearable device of the worker. When executed by the at least one processor, the one or more instructions may cause the at least one processor to monitor the physiological data to detect at least one potential hazard based on a hazard classifier. The hazard classifier may include at least one machine learning model trained based on historical physiological data associated with the plurality of physiological parameters. When executed by the at least one processor, the one or more instructions may cause the at least one processor to communicate at least one communication based on the at least one potential hazard.

In some non-limiting embodiments or aspects, the plurality of physiological parameters may include at least one of heart rate, body temperature, blood pressure, galvanic skin response, cardiac arrhythmia, breathing rate, blood oxygen level, gait, motion, body motion, limb motion, sounds, vibrations, a measurable quantity from the body of the worker, or any combination thereof.

In some non-limiting embodiments or aspects, the physiological data may include at least one of accelerometer data, blood volume pulse data, electrodermal activity data, body temperature data, gyroscope data, heart rate data, blood pressure data, galvanic skin response data, cardiac arrhythmia data, breathing rate data, blood oxygen level data, gait data, acoustic data, vibration data, sound data, motion data, body motion data, limb motion data, or any combination thereof.

In some non-limiting embodiments or aspects, the wearable device may include a plurality of sensors associated with the plurality of physiological parameters.

In some non-limiting embodiments or aspects, the plurality of sensors may include at least one of an accelerometer, a blood volume pulse sensor, an electrodermal activity sensor, a body temperature sensor, a gyroscope, a heart rate sensor, a blood pressure sensor, a galvanic skin response sensor, a cardiac arrhythmia sensor, a breathing rate sensor, a blood oxygen level sensor, a gait sensor, an acoustic sensor, a vibration sensor, a microphone, a motion sensor, or any combination thereof.

In some non-limiting embodiments or aspects, the physiological data may include raw sensor data from the plurality of sensors.

In some non-limiting embodiments or aspects, the at least one machine learning model may include at least one of a random forest model, a decision tree model, a neural network, a recurrent neural network, a long short-term memory model, an autoregressive integrated moving average, or any combination thereof.

In some non-limiting embodiments or aspects, the hazard classifier may include a plurality of machine learning models, each machine learning model of the plurality of machine learning models associated with a respective potential hazard of a plurality of potential hazards.

In some non-limiting embodiments or aspects, the at least one potential hazard may include at least one of a slip, a trip, a fall, heat stress, impairment, a hazardous substance, a hazardous environment, a distraction, violence, fatigue, contact with at least one object, a driving accident, a lack of oxygen, or any combination thereof.

In some non-limiting embodiments or aspects, the at least one potential hazard may include at least one of a current hazard, a future hazard, or any combination thereof.

In some non-limiting embodiments or aspects, the wearable device may include at least one of a wrist-wearable device, a torso-wearable device, a garment configured to be worn by the worker, or any combination thereof.

In some non-limiting embodiments or aspects, communicating the at least one communication may include at least one of displaying an alert message to the worker, playing an audible alert message to the worker, generating a haptic alert, displaying a prompt to the worker, communicating at least one message to a remote computer system, communicating at least one message to a safety personnel computing device, or any combination thereof.

In some non-limiting embodiments or aspects, the at least one processor may include at least one remote computer system processor of a remote computer system remote from the worker, wherein communicating the at least one communication may include communicating an alert message to at least one of the wearable device, a safety personnel computing device, or any combination thereof.

In some non-limiting embodiments or aspects, the at least one processor may include at least one mobile device processor of a mobile device proximate to the worker. The one or more instructions, when executed by the at least one processor, may further cause the at least one processor to communicate the physiological data to a remote computer system.

In some non-limiting embodiments or aspects, the remote computer system may be configured to receive the historical physiological data, train the at least one machine learning model of the hazard classifier based on the historical physiological data, and communicate the trained hazard classifier to the mobile device.

In some non-limiting embodiments or aspects, the remote computer system may be configured to receive the physiological data.

In some non-limiting embodiments or aspects, the remote computer system may be configured to retrain the at least one machine learning model of the hazard classifier based on the physiological data.

In some non-limiting embodiments or aspects, the remote computer system may be configured to communicate the retrained hazard classifier to the mobile device.

In some non-limiting embodiments or aspects, the remote computer system may be configured to communicate at least one further communication to a safety personnel computing device based on receiving the physiological data.

In some non-limiting embodiments or aspects, the safety personnel computing device may be configured to display at least one graphical user interface based on the at least one further communication.

In some non-limiting embodiments or aspects, displaying the at least one graphical user interface may include at least one of displaying an alert message, displaying location data associated with the at least one potential hazard, displaying at least one dashboard, or any combination thereof.

In some non-limiting embodiments or aspects, the at least one dashboard may include at least one of at least one gauge graphical element, at least one bar graphical element, or any combination thereof.

In some non-limiting embodiments or aspects, the at least one gauge graphical element may include a plurality of gauge graphical elements, which may include a first gauge graphical element associated with inherent risk of the at least one potential hazard, a second gauge graphical element associated with current risk of the at least one potential hazard, and a third gauge graphical element associated with future risk of the at least one potential hazard.

In some non-limiting embodiments or aspects, the at least one bar graphical element may include a plurality of bar graphical elements, which may include a first subset of bar graphical elements associated with worker data of the worker, a second subset of bar graphical elements associated with at least one current potential hazard of the at least one potential hazard, and a third subset of bar graphical elements associated with at least one future potential hazard of the at least one potential hazard.

In some non-limiting embodiments or aspects, monitoring the physiological data to detect the at least one potential hazard based on the hazard classifier may include inputting the physiological data to the hazard classifier to generate at least one prediction associated with the at least one potential hazard.

In some non-limiting embodiments or aspects, the one or more instructions, when executed by the at least one processor, may further cause the at least one processor to determine a risk level based on the at least one potential hazard, wherein communicating the at least one communication may include communicating the at least one communication based on the risk level.

In some non-limiting embodiments or aspects, the risk level may include a risk level category of a plurality of risk level categories. The plurality of risk level categories may include at least one of an individual risk level category, a department risk level category, a location risk level category, a mid-level risk level category, a corporate risk level category, or any combination thereof.

In some non-limiting embodiments or aspects, the hazard classifier may be calibrated based on worker data of the worker.

In some non-limiting embodiments or aspects, the worker data of the worker may include at least one of age, height, weight, body mass index, gender, gait, fitness level, fear of heights, rushing tendency, experience level, experience time, or any combination thereof.

According to non-limiting embodiments or aspects, provided is a system for human-centered safety using physiological indicators to detect at least one potential hazard. The system may include a wearable device configured to be worn by a worker. The wearable device may include a plurality of sensors configured to sense a plurality of physiological parameters of the worker. The system may include a remote computer system remote from the worker. The system may include a mobile device proximate to the worker. The mobile device may be configured to receive physiological data associated with the plurality of physiological parameters of the worker from the wearable device. The mobile device may be configured to communicate the physiological data to the remote computer system. The mobile device may be configured to monitor the physiological data to detect at least one potential hazard based on a hazard classifier. The hazard classifier may include at least one machine learning model trained based on historical physiological data associated with the plurality of physiological parameters.

In some non-limiting embodiments or aspects, the plurality of physiological parameters may include at least one of heart rate, body temperature, blood pressure, galvanic skin response, cardiac arrhythmia, breathing rate, blood oxygen level, gait, motion, body motion, limb motion, sounds, vibrations, a measurable quantity from the body of the worker, or any combination thereof.

In some non-limiting embodiments or aspects, the physiological data may include at least one of accelerometer data, blood volume pulse data, electrodermal activity data, body temperature data, gyroscope data, heart rate data, blood pressure data, galvanic skin response data, cardiac arrhythmia data, breathing rate data, blood oxygen level data, gait data, acoustic data, vibration data, sound data, motion data, body motion data, limb motion data, or any combination thereof.

In some non-limiting embodiments or aspects, the wearable device may include a plurality of sensors associated with the plurality of physiological parameters.

In some non-limiting embodiments or aspects, the plurality of sensors may include at least one of an accelerometer, a blood volume pulse sensor, an electrodermal activity sensor, a body temperature sensor, a gyroscope, a heart rate sensor, a blood pressure sensor, a galvanic skin response sensor, a cardiac arrhythmia sensor, a breathing rate sensor, a blood oxygen level sensor, a gait sensor, an acoustic sensor, a vibration sensor, a microphone, a motion sensor, or any combination thereof.

In some non-limiting embodiments or aspects, the physiological data may include raw sensor data from the plurality of sensors.

In some non-limiting embodiments or aspects, the at least one machine learning model may include at least one of a random forest model, a decision tree model, a neural network, a recurrent neural network, a long short-term memory model, an autoregressive integrated moving average, or any combination thereof.

In some non-limiting embodiments or aspects, the hazard classifier may include a plurality of machine learning models, each machine learning model of the plurality of machine learning models associated with a respective potential hazard of a plurality of potential hazards.

In some non-limiting embodiments or aspects, the at least one potential hazard may include at least one of a slip, a trip, a fall, heat stress, impairment, a hazardous substance, a hazardous environment, a distraction, violence, fatigue, contact with at least one object, a driving accident, a lack of oxygen, or any combination thereof.

In some non-limiting embodiments or aspects, the at least one potential hazard may include at least one of a current hazard, a future hazard, or any combination thereof.

In some non-limiting embodiments or aspects, the wearable device may include at least one of a wrist-wearable device, a torso-wearable device, a garment configured to be worn by the worker, or any combination thereof.

In some non-limiting embodiments or aspects, the mobile device may be further configured to communicate at least one communication based on the at least one potential hazard. Communicating the at least one communication may include at least one of displaying an alert message to the worker, playing an audible alert message to the worker, generating a haptic alert, displaying a prompt to the worker, communicating at least one message to a remote computer system, communicating at least one message to a safety personnel computing device, or any combination thereof.

In some non-limiting embodiments or aspects, the remote computer system may be configured to monitor the physiological data to detect the at least one potential hazard based on the hazard classifier and/or communicate at least one communication based on the at least one potential hazard. Communicating the at least one communication may include communicating an alert message to at least one of the wearable device, a safety personnel computing device, or any combination thereof.

In some non-limiting embodiments or aspects, the remote computer system may be configured to receive the historical physiological data, train the at least one machine learning model of the hazard classifier based on the historical physiological data, and/or communicate the trained hazard classifier to the mobile device.

In some non-limiting embodiments or aspects, the remote computer system may be configured to receive the physiological data.

In some non-limiting embodiments or aspects, the remote computer system may be configured to retrain the at least one machine learning model of the hazard classifier based on the physiological data.

In some non-limiting embodiments or aspects, the remote computer system may be configured to communicate the retrained hazard classifier to the mobile device.

In some non-limiting embodiments or aspects, the remote computer system may be configured to communicate at least one further communication to a safety personnel computing device based on receiving the physiological data.

In some non-limiting embodiments or aspects, the safety personnel computing device may be configured to display at least one graphical user interface based on the at least one further communication.

In some non-limiting embodiments or aspects, displaying the at least one graphical user interface may include at least one of displaying an alert message, displaying location data associated with the at least one potential hazard, displaying at least one dashboard, or any combination thereof.

In some non-limiting embodiments or aspects, the at least one dashboard may include at least one of at least one gauge graphical element, at least one bar graphical element, or any combination thereof.

In some non-limiting embodiments or aspects, the at least one gauge graphical element may include a plurality of gauge graphical elements, which may include a first gauge graphical element associated with inherent risk of the at least one potential hazard, a second gauge graphical element associated with current risk of the at least one potential hazard, and a third gauge graphical element associated with future risk of the at least one potential hazard.

In some non-limiting embodiments or aspects, the at least one bar graphical element may include a plurality of bar graphical elements, which may include a first subset of bar graphical elements associated with worker data of the worker, a second subset of bar graphical elements associated with at least one current potential hazard of the at least one potential hazard, and a third subset of bar graphical elements associated with at least one future potential hazard of the at least one potential hazard.

In some non-limiting embodiments or aspects, monitoring the physiological data to detect the at least one potential hazard based on the hazard classifier may include inputting the physiological data to the hazard classifier to generate at least one prediction associated with the at least one potential hazard.

In some non-limiting embodiments or aspects, at least one of the mobile device or the remote computer system is configured to determine a risk level based on the at least one potential hazard and/or to communicate at least one communication based on the risk level.

In some non-limiting embodiments or aspects, the risk level may include a risk level category of a plurality of risk level categories, the plurality of risk level categories may include at least one of an individual risk level category, a department risk level category, a location risk level category, a mid-level risk level category, a corporate risk level category, or any combination thereof.

In some non-limiting embodiments or aspects, the hazard classifier may be calibrated based on worker data of the worker.

In some non-limiting embodiments or aspects, the worker data of the worker may include at least one of age, height, weight, body mass index, gender, gait, fitness level, fear of heights, rushing tendency, experience level, experience time, or any combination thereof.

According to non-limiting embodiments or aspects, provided is a computer program product for human-centered safety using physiological indicators to detect at least one potential hazard. The computer program product may include at least one non-transitory computer-readable medium including one or more instructions. When executed by at least one processor, the one or more instructions may cause the at least one processor to receive physiological data associated with a plurality of physiological parameters of a worker from a wearable device of the worker. When executed by at least one processor, the one or more instructions may cause the at least one processor to monitor the physiological data to detect at least one potential hazard based on a hazard classifier. The hazard classifier may include at least one machine learning model trained based on historical physiological data associated with the plurality of physiological parameters. When executed by at least one processor, the one or more instructions may cause the at least one processor to communicate at least one communication based on the at least one potential hazard.

In some non-limiting embodiments or aspects, the plurality of physiological parameters may include at least one of heart rate, body temperature, blood pressure, galvanic skin response, cardiac arrhythmia, breathing rate, blood oxygen level, gait, motion, body motion, limb motion, sounds, vibrations, a measurable quantity from the body of the worker, or any combination thereof.

In some non-limiting embodiments or aspects, the physiological data may include at least one of accelerometer data, blood volume pulse data, electrodermal activity data, body temperature data, gyroscope data, heart rate data, blood pressure data, galvanic skin response data, cardiac arrhythmia data, breathing rate data, blood oxygen level data, gait data, acoustic data, vibration data, sound data, motion data, body motion data, limb motion data, or any combination thereof.

In some non-limiting embodiments or aspects, the wearable device may include a plurality of sensors associated with the plurality of physiological parameters.

In some non-limiting embodiments or aspects, the plurality of sensors may include at least one of an accelerometer, a blood volume pulse sensor, an electrodermal activity sensor, a body temperature sensor, a gyroscope, a heart rate sensor, a blood pressure sensor, a galvanic skin response sensor, a cardiac arrhythmia sensor, a breathing rate sensor, a blood oxygen level sensor, a gait sensor, an acoustic sensor, a vibration sensor, a microphone, a motion sensor, or any combination thereof.

In some non-limiting embodiments or aspects, the physiological data may include raw sensor data from the plurality of sensors.

In some non-limiting embodiments or aspects, the at least one machine learning model may include at least one of a random forest model, a decision tree model, a neural network, a recurrent neural network, a long short-term memory model, an autoregressive integrated moving average, or any combination thereof.

In some non-limiting embodiments or aspects, the hazard classifier may include a plurality of machine learning models, each machine learning model of the plurality of machine learning models associated with a respective potential hazard of a plurality of potential hazards.

In some non-limiting embodiments or aspects, the at least one potential hazard may include at least one of a slip, a trip, a fall, heat stress, impairment, a hazardous substance, a hazardous environment, a distraction, violence, fatigue, contact with at least one object, a driving accident, a lack of oxygen, or any combination thereof.

In some non-limiting embodiments or aspects, the at least one potential hazard may include at least one of a current hazard, a future hazard, or any combination thereof.

In some non-limiting embodiments or aspects, the wearable device may include at least one of a wrist-wearable device, a torso-wearable device, a garment configured to be worn by the worker, or any combination thereof.

In some non-limiting embodiments or aspects, communicating the at least one communication may include at least one of displaying an alert message to the worker, playing an audible alert message to the worker, generating a haptic alert, displaying a prompt to the worker, communicating at least one message to a remote computer system, communicating at least one message to a safety personnel computing device, or any combination thereof.

In some non-limiting embodiments or aspects, the at least one processor may include at least one remote computer system processor of a remote computer system remote from the worker, wherein communicating the at least one communication may include communicating an alert message to at least one of the wearable device, a safety personnel computing device, or any combination thereof.

In some non-limiting embodiments or aspects, the at least one processor may include at least one mobile device processor of a mobile device proximate to the worker. The one or more instructions, when executed by the at least one processor, may further cause the at least one processor to communicate the physiological data to a remote computer system.

In some non-limiting embodiments or aspects, the remote computer system may be configured to receive the historical physiological data, train the at least one machine learning model of the hazard classifier based on the historical physiological data, and communicate the trained hazard classifier to the mobile device.

In some non-limiting embodiments or aspects, the remote computer system may be configured to receive the physiological data.

In some non-limiting embodiments or aspects, the remote computer system may be configured to retrain the at least one machine learning model of the hazard classifier based on the physiological data.

In some non-limiting embodiments or aspects, the remote computer system may be configured to communicate the retrained hazard classifier to the mobile device.

In some non-limiting embodiments or aspects, the remote computer system may be configured to communicate at least one further communication to a safety personnel computing device based on receiving the physiological data.

In some non-limiting embodiments or aspects, the safety personnel computing device may be configured to display at least one graphical user interface based on the at least one further communication.

In some non-limiting embodiments or aspects, displaying the at least one graphical user interface may include at least one of displaying an alert message, displaying location data associated with the at least one potential hazard, displaying at least one dashboard, or any combination thereof.

In some non-limiting embodiments or aspects, the at least one dashboard may include at least one of at least one gauge graphical element, at least one bar graphical element, or any combination thereof.

In some non-limiting embodiments or aspects, the at least one gauge graphical element may include a plurality of gauge graphical elements, which may include a first gauge graphical element associated with inherent risk of the at least one potential hazard, a second gauge graphical element associated with current risk of the at least one potential hazard, and a third gauge graphical element associated with future risk of the at least one potential hazard.

In some non-limiting embodiments or aspects, the at least one bar graphical element may include a plurality of bar graphical elements, which may include a first subset of bar graphical elements associated with worker data of the worker, a second subset of bar graphical elements associated with at least one current potential hazard of the at least one potential hazard, and a third subset of bar graphical elements associated with at least one future potential hazard of the at least one potential hazard.

In some non-limiting embodiments or aspects, monitoring the physiological data to detect the at least one potential hazard based on the hazard classifier may include inputting the physiological data to the hazard classifier to generate at least one prediction associated with the at least one potential hazard.

In some non-limiting embodiments or aspects, the one or more instructions, when executed by the at least one processor, may further cause the at least one processor to determine a risk level based on the at least one potential hazard, wherein communicating the at least one communication may include communicating the at least one communication based on the risk level.

In some non-limiting embodiments or aspects, the risk level may include a risk level category of a plurality of risk level categories. The plurality of risk level categories may include at least one of an individual risk level category, a department risk level category, a location risk level category, a mid-level risk level category, a corporate risk level category, or any combination thereof.

In some non-limiting embodiments or aspects, the hazard classifier may be calibrated based on worker data of the worker.

In some non-limiting embodiments or aspects, the worker data of the worker may include at least one of age, height, weight, body mass index, gender, gait, fitness level, fear of heights, rushing tendency, experience level, experience time, or any combination thereof.

Other non-limiting embodiments or aspects will be set forth in the following numbered clauses:

Clause 1: A method for human-centered safety using physiological indicators to detect at least one potential hazard, comprising: receiving, with at least one processor, physiological data associated with a plurality of physiological parameters of a worker from a wearable device of the worker; monitoring, with the at least one processor, the physiological data to detect at least one potential hazard based on a hazard classifier, the hazard classifier comprising at least one machine learning model trained based on historical physiological data associated with the plurality of physiological parameters; and communicating, with the at least one processor, at least one communication based on the at least one potential hazard.

Clause 2: The method of clause 1, wherein the plurality of physiological parameters comprise at least one of heart rate, body temperature, blood pressure, galvanic skin response, cardiac arrhythmia, breathing rate, blood oxygen level, gait, motion, body motion, limb motion, sounds, vibrations, a measurable quantity from the body of the worker, or any combination thereof.

Clause 3: The method of clause 1 or clause 2, wherein the physiological data comprises at least one of accelerometer data, blood volume pulse data, electrodermal activity data, body temperature data, gyroscope data, heart rate data, blood pressure data, galvanic skin response data, cardiac arrhythmia data, breathing rate data, blood oxygen level data, gait data, acoustic data, vibration data, sound data, motion data, body motion data, limb motion data, or any combination thereof.

Clause 4: The method of any of clauses 1-3, wherein the wearable device comprises a plurality of sensors associated with the plurality of physiological parameters.

Clause 5: The method of any of clauses 1-4, wherein the plurality of sensors comprise at least one of an accelerometer, a blood volume pulse sensor, an electrodermal activity sensor, a body temperature sensor, a gyroscope, a heart rate sensor, a blood pressure sensor, a galvanic skin response sensor, a cardiac arrhythmia sensor, a breathing rate sensor, a blood oxygen level sensor, a gait sensor, an acoustic sensor, a vibration sensor, a microphone, a motion sensor, or any combination thereof.

Clause 6: The method of any of clauses 1-5, wherein the physiological data comprises raw sensor data from the plurality of sensors.

Clause 7: The method of any of clauses 1-6, wherein the at least one machine learning model comprises at least one of a random forest model, a decision tree model, a neural network, a recurrent neural network, a long short-term memory model, an autoregressive integrated moving average, or any combination thereof.

Clause 8: The method of any of clauses 1-7, wherein the hazard classifier comprises a plurality of machine learning models, each machine learning model of the plurality of machine learning models associated with a respective potential hazard of a plurality of potential hazards.

Clause 9: The method of any of clauses 1-8, wherein the at least one potential hazard comprises at least one of a slip, a trip, a fall, heat stress, impairment, a hazardous substance, a hazardous environment, a distraction, violence, fatigue, contact with at least one object, a driving accident, a lack of oxygen, or any combination thereof.

Clause 10: The method of any of clauses 1-9, wherein the at least one potential hazard comprises at least one of a current hazard, a future hazard, or any combination thereof.

Clause 11: The method of any of clauses 1-10, wherein the wearable device comprises at least one of a wrist-wearable device, a torso-wearable device, a garment configured to be worn by the worker, or any combination thereof.

Clause 12: The method of any of clauses 1-11, wherein communicating the at least one communication comprises at least one of displaying an alert message to the worker, playing an audible alert message to the worker, generating a haptic alert, displaying a prompt to the worker, communicating at least one message to a remote computer system, communicating at least one message to a safety personnel computing device, or any combination thereof.

Clause 13: The method of any of clauses 1-12, wherein the at least one processor comprises at least one remote computer system processor of a remote computer system remote from the worker, wherein communicating the at least one communication comprises communicating an alert message to at least one of the wearable device, a safety personnel computing device, or any combination thereof.

Clause 14: The method of any of clauses 1-13, wherein the at least one processor comprises at least one mobile device processor of a mobile device proximate to the worker, the method further comprising communicating, with the at least one mobile device processor, the physiological data to a remote computer system.

Clause 15: The method of any of clauses 1-14, further comprising: receiving, with the remote computer system, the historical physiological data; training, with the remote computer system, the at least one machine learning model of the hazard classifier based on the historical physiological data; and communicating, with the remote computer system, the trained hazard classifier to the mobile device.

Clause 16: The method of any of clauses 1-15, further comprising: receiving, with the remote computer system, the physiological data.

Clause 17: The method of any of clauses 1-16, further comprising: retraining, with the remote computer system, the at least one machine learning model of the hazard classifier based on the physiological data.

Clause 18: The method of any of clauses 1-17, further comprising: communicating, with the remote computer system, the retrained hazard classifier to the mobile device.

Clause 19: The method of any of clauses 1-18, further comprising: communicating, with the remote computer system, at least one further communication to a safety personnel computing device based on receiving the physiological data.

Clause 20: The method of any of clauses 1-19, further comprising: displaying, with the safety personnel computing device, at least one graphical user interface based on the at least one further communication.

Clause 21: The method of any of clauses 1-20, wherein displaying the at least one graphical user interface comprises at least one of: displaying an alert message; displaying location data associated with the at least one potential hazard; displaying at least one dashboard; or any combination thereof.

Clause 22: The method of any of clauses 1-21, wherein the at least one dashboard comprises at least one of: at least one gauge graphical element; at least one bar graphical element; or any combination thereof.

Clause 23: The method of any of clauses 1-22, wherein the at least one gauge graphical element comprises a plurality of gauge graphical elements comprising a first gauge graphical element associated with inherent risk of the at least one potential hazard, a second gauge graphical element associated with current risk of the at least one potential hazard, and a third gauge graphical element associated with future risk of the at least one potential hazard.

Clause 24: The method of any of clauses 1-23, wherein the at least one bar graphical element comprises a plurality of bar graphical elements comprising a first subset of bar graphical elements associated with worker data of the worker, a second subset of bar graphical elements associated with at least one current potential hazard of the at least one potential hazard, and a third subset of bar graphical elements associated with at least one future potential hazard of the at least one potential hazard.

Clause 25: The method of any of clauses 1-24, wherein monitoring the physiological data to detect the at least one potential hazard based on the hazard classifier comprises inputting the physiological data to the hazard classifier to generate at least one prediction associated with the at least one potential hazard.

Clause 26: The method of any of clauses 1-25, further comprising determining a risk level based on the at least one potential hazard, wherein communicating the at least one communication comprises communicating the at least one communication based on the risk level.

Clause 27: The method of any of clauses 1-26, wherein the risk level comprises a risk level category of a plurality of risk level categories, the plurality of risk level categories comprising at least one of an individual risk level category, a department risk level category, a location risk level category, a mid-level risk level category, a corporate risk level category, or any combination thereof.

Clause 28: The method of any of clauses 1-27, wherein the hazard classifier is calibrated based on worker data of the worker.

Clause 29: The method of any of clauses 1-28, wherein the worker data of the worker comprises at least one of age, height, weight, body mass index, gender, gait, fitness level, fear of heights, rushing tendency, experience level, experience time, or any combination thereof.

Clause 30: A system for human-centered safety using physiological indicators to detect at least one potential hazard, comprising: at least one processor; and at least one non-transitory computer-readable medium comprising one or more instructions that, when executed by the at least one processor, cause the at least one processor to: receive physiological data associated with a plurality of physiological parameters of a worker from a wearable device of the worker; monitor the physiological data to detect at least one potential hazard based on a hazard classifier, the hazard classifier comprising at least one machine learning model trained based on historical physiological data associated with the plurality of physiological parameters; and communicate at least one communication based on the at least one potential hazard.

Clause 31: The system of clause 30, wherein the plurality of physiological parameters comprise at least one of heart rate, body temperature, blood pressure, galvanic skin response, cardiac arrhythmia, breathing rate, blood oxygen level, gait, motion, body motion, limb motion, sounds, vibrations, a measurable quantity from the body of the worker, or any combination thereof.

Clause 32: The system of clause 30 or clause 31, wherein the physiological data comprises at least one of accelerometer data, blood volume pulse data, electrodermal activity data, body temperature data, gyroscope data, heart rate data, blood pressure data, galvanic skin response data, cardiac arrhythmia data, breathing rate data, blood oxygen level data, gait data, acoustic data, vibration data, sound data, motion data, body motion data, limb motion data, or any combination thereof.

Clause 33: The system of any of clauses 30-32, wherein the wearable device comprises a plurality of sensors associated with the plurality of physiological parameters.

Clause 34: The system of any of clauses 30-33, wherein the plurality of sensors comprise at least one of an accelerometer, a blood volume pulse sensor, an electrodermal activity sensor, a body temperature sensor, a gyroscope, a heart rate sensor, a blood pressure sensor, a galvanic skin response sensor, a cardiac arrhythmia sensor, a breathing rate sensor, a blood oxygen level sensor, a gait sensor, an acoustic sensor, a vibration sensor, a microphone, a motion sensor, or any combination thereof.

Clause 35: The system of any of clauses 30-34, wherein the physiological data comprises raw sensor data from the plurality of sensors.

Clause 36: The system of any of clauses 30-35, wherein the at least one machine learning model comprises at least one of a random forest model, a decision tree model, a neural network, a recurrent neural network, a long short-term memory model, an autoregressive integrated moving average, or any combination thereof.

Clause 37: The system of any of clauses 30-36, wherein the hazard classifier comprises a plurality of machine learning models, each machine learning model of the plurality of machine learning models associated with a respective potential hazard of a plurality of potential hazards.

Clause 38: The system of any of clauses 30-37, wherein the at least one potential hazard comprises at least one of a slip, a trip, a fall, heat stress, impairment, a hazardous substance, a hazardous environment, a distraction, violence, fatigue, contact with at least one object, a driving accident, a lack of oxygen, or any combination thereof.

Clause 39: The system of any of clauses 30-38, wherein the at least one potential hazard comprises at least one of a current hazard, a future hazard, or any combination thereof.

Clause 40: The system of any of clauses 30-39, wherein the wearable device comprises at least one of a wrist-wearable device, a torso-wearable device, a garment configured to be worn by the worker, or any combination thereof.

Clause 41: The system of any of clauses 30-40, wherein communicating the at least one communication comprises at least one of displaying an alert message to the worker, playing an audible alert message to the worker, generating a haptic alert, displaying a prompt to the worker, communicating at least one message to a remote computer system, communicating at least one message to a safety personnel computing device, or any combination thereof.

Clause 42: The system of any of clauses 30-41, wherein the at least one processor comprises at least one remote computer system processor of a remote computer system remote from the worker, wherein communicating the at least one communication comprises communicating an alert message to at least one of the wearable device, a safety personnel computing device, or any combination thereof.

Clause 43: The system of any of clauses 30-42, wherein the at least one processor comprises at least one mobile device processor of a mobile device proximate to the worker, wherein the one or more instructions, when executed by the at least one processor, further cause the at least one processor to: communicate the physiological data to a remote computer system.

Clause 44: The system of any of clauses 30-43, wherein the remote computer system is configured to: receive the historical physiological data; train the at least one machine learning model of the hazard classifier based on the historical physiological data; and communicate the trained hazard classifier to the mobile device.

Clause 45: The system of any of clauses 30-44, wherein the remote computer system is configured to: receive the physiological data.

Clause 46: The system of any of clauses 30-45, wherein the remote computer system is configured to: retrain the at least one machine learning model of the hazard classifier based on the physiological data.

Clause 47: The system of any of clauses 30-46, wherein the remote computer system is configured to: communicate the retrained hazard classifier to the mobile device.

Clause 48: The system of any of clauses 30-47, wherein the remote computer system is configured to: communicate at least one further communication to a safety personnel computing device based on receiving the physiological data.

Clause 49: The system of any of clauses 30-48, wherein the safety personnel computing device is configured to: display at least one graphical user interface based on the at least one further communication.

Clause 50: The system of any of clauses 30-49, wherein displaying the at least one graphical user interface comprises at least one of: displaying an alert message; displaying location data associated with the at least one potential hazard; displaying at least one dashboard; or any combination thereof.

Clause 51: The system of any of clauses 30-50, wherein the at least one dashboard comprises at least one of: at least one gauge graphical element; at least one bar graphical element; or any combination thereof.

Clause 52: The system of any of clauses 30-51, wherein the at least one gauge graphical element comprises a plurality of gauge graphical elements comprising a first gauge graphical element associated with inherent risk of the at least one potential hazard, a second gauge graphical element associated with current risk of the at least one potential hazard, and a third gauge graphical element associated with future risk of the at least one potential hazard.

Clause 53: The system of any of clauses 30-52, wherein the at least one bar graphical element comprises a plurality of bar graphical elements comprising a first subset of bar graphical elements associated with worker data of the worker, a second subset of bar graphical elements associated with at least one current potential hazard of the at least one potential hazard, and a third subset of bar graphical elements associated with at least one future potential hazard of the at least one potential hazard.

Clause 54: The system of any of clauses 30-53, wherein monitoring the physiological data to detect the at least one potential hazard based on the hazard classifier comprises inputting the physiological data to the hazard classifier to generate at least one prediction associated with the at least one potential hazard.

Clause 55: The system of any of clauses 30-54 wherein the one or more instructions, when executed by the at least one processor, further cause the at least one processor to: determine a risk level based on the at least one potential hazard, wherein communicating the at least one communication comprises communicating the at least one communication based on the risk level.

Clause 56: The system of any of clauses 30-55, wherein the risk level comprises a risk level category of a plurality of risk level categories, the plurality of risk level categories comprising at least one of an individual risk level category, a department risk level category, a location risk level category, a mid-level risk level category, a corporate risk level category, or any combination thereof.

Clause 57: The system of any of clauses 30-56, wherein the hazard classifier is calibrated based on worker data of the worker.

Clause 58: The system of any of clauses 30-57, wherein the worker data of the worker comprises at least one of age, height, weight, body mass index, gender, gait, fitness level, fear of heights, rushing tendency, experience level, experience time, or any combination thereof.

Clause 59: A system for human-centered safety using physiological indicators to detect at least one potential hazard, comprising: a wearable device configured to be worn by a worker, the wearable device comprising a plurality of sensors configured to sense a plurality of physiological parameters of the worker; a remote computer system remote from the worker; and a mobile device proximate to the worker, the mobile device configured to: receive physiological data associated with the plurality of physiological parameters of the worker from the wearable device; communicate the physiological data to the remote computer system; and monitor the physiological data to detect at least one potential hazard based on a hazard classifier, the hazard classifier comprising at least one machine learning model trained based on historical physiological data associated with the plurality of physiological parameters.

Clause 60: The system of clause 59, wherein the plurality of physiological parameters comprise at least one of heart rate, body temperature, blood pressure, galvanic skin response, cardiac arrhythmia, breathing rate, blood oxygen level, gait, motion, body motion, limb motion, sounds, vibrations, a measurable quantity from the body of the worker, or any combination thereof.

Clause 61: The system of clause 59 or clause 60, wherein the physiological data comprises at least one of accelerometer data, blood volume pulse data, electrodermal activity data, body temperature data, gyroscope data, heart rate data, blood pressure data, galvanic skin response data, cardiac arrhythmia data, breathing rate data, blood oxygen level data, gait data, acoustic data, vibration data, sound data, motion data, body motion data, limb motion data, or any combination thereof.

Clause 62: The system of any of clauses 59-61, wherein the wearable device comprises a plurality of sensors associated with the plurality of physiological parameters.

Clause 63: The system of any of clauses 59-62, wherein the plurality of sensors comprise at least one of an accelerometer, a blood volume pulse sensor, an electrodermal activity sensor, a body temperature sensor, a gyroscope, a heart rate sensor, a blood pressure sensor, a galvanic skin response sensor, a cardiac arrhythmia sensor, a breathing rate sensor, a blood oxygen level sensor, a gait sensor, an acoustic sensor, a vibration sensor, a microphone, a motion sensor, or any combination thereof.

Clause 64: The system of any of clauses 59-63, wherein the physiological data comprises raw sensor data from the plurality of sensors.

Clause 65: The system of any of clauses 59-64, wherein the at least one machine learning model comprises at least one of a random forest model, a decision tree model, a neural network, a recurrent neural network, a long short-term memory model, an autoregressive integrated moving average, or any combination thereof.

Clause 66: The system of any of clauses 59-65, wherein the hazard classifier comprises a plurality of machine learning models, each machine learning model of the plurality of machine learning models associated with a respective potential hazard of a plurality of potential hazards.

Clause 67: The system of any of clauses 59-66, wherein the at least one potential hazard comprises at least one of a slip, a trip, a fall, heat stress, impairment, a hazardous substance, a hazardous environment, a distraction, violence, fatigue, contact with at least one object, a driving accident, a lack of oxygen, or any combination thereof.

Clause 68: The system of any of clauses 59-67, wherein the at least one potential hazard comprises at least one of a current hazard, a future hazard, or any combination thereof.

Clause 69: The system of any of clauses 59-68, wherein the wearable device comprises at least one of a wrist-wearable device, a torso-wearable device, a garment configured to be worn by the worker, or any combination thereof.

Clause 70: The system of any of clauses 59-69, wherein the mobile device is further configured to: communicate at least one communication based on the at least one potential hazard, wherein communicating the at least one communication comprises at least one of displaying an alert message to the worker, playing an audible alert message to the worker, generating a haptic alert, displaying a prompt to the worker, communicating at least one message to a remote computer system, communicating at least one message to a safety personnel computing device, or any combination thereof.

Clause 71: The system of any of clauses 59-70, wherein the remote computer system is further configured to: monitor the physiological data to detect the at least one potential hazard based on the hazard classifier; and communicate at least one communication based on the at least one potential hazard, wherein communicating the at least one communication comprises communicating an alert message to at least one of the wearable device, a safety personnel computing device, or any combination thereof.

Clause 72: The system of any of clauses 59-71, wherein the remote computer system is configured to: receive the historical physiological data; train the at least one machine learning model of the hazard classifier based on the historical physiological data; and communicate the trained hazard classifier to the mobile device.

Clause 73: The system of any of clauses 59-72, wherein the remote computer system is configured to: receive the physiological data.

Clause 74: The system of any of clauses 59-73, wherein the remote computer system is configured to: retrain the at least one machine learning model of the hazard classifier based on the physiological data.

Clause 75: The system of any of clauses 59-74, wherein the remote computer system is configured to: communicate the retrained hazard classifier to the mobile device.

Clause 76: The system of any of clauses 59-75, wherein the remote computer system is configured to: communicate at least one further communication to a safety personnel computing device based on receiving the physiological data.

Clause 77: The system of any of clauses 59-76, wherein the safety personnel computing device is configured to: display at least one graphical user interface based on the at least one further communication.

Clause 78: The system of any of clauses 59-77, wherein displaying the at least one graphical user interface comprises at least one of: displaying an alert message; displaying location data associated with the at least one potential hazard; displaying at least one dashboard; or any combination thereof.

Clause 79: The system of any of clauses 59-78, wherein the at least one dashboard comprises at least one of: at least one gauge graphical element; at least one bar graphical element; or any combination thereof.

Clause 80: The system of any of clauses 59-79, wherein the at least one gauge graphical element comprises a plurality of gauge graphical elements comprising a first gauge graphical element associated with inherent risk of the at least one potential hazard, a second gauge graphical element associated with current risk of the at least one potential hazard, and a third gauge graphical element associated with future risk of the at least one potential hazard.

Clause 81: The system of any of clauses 59-80, wherein the at least one bar graphical element comprises a plurality of bar graphical elements comprising a first subset of bar graphical elements associated with worker data of the worker, a second subset of bar graphical elements associated with at least one current potential hazard of the at least one potential hazard, and a third subset of bar graphical elements associated with at least one future potential hazard of the at least one potential hazard.

Clause 82: The system of any of clauses 59-81, wherein monitoring the physiological data to detect the at least one potential hazard based on the hazard classifier comprises inputting the physiological data to the hazard classifier to generate at least one prediction associated with the at least one potential hazard.

Clause 83: The system of any of clauses 59-82, at least one of the mobile device or the remote computer system is configured to: determine a risk level based on the at least one potential hazard; and communicate at least one communication based on the risk level.

Clause 84: The system of any of clauses 59-83, wherein the risk level comprises a risk level category of a plurality of risk level categories, the plurality of risk level categories comprising at least one of an individual risk level category, a department risk level category, a location risk level category, a mid-level risk level category, a corporate risk level category, or any combination thereof.

Clause 85: The system of any of clauses 59-84, wherein the hazard classifier is calibrated based on worker data of the worker.

Clause 86: The system of any of clauses 59-85, wherein the worker data of the worker comprises at least one of age, height, weight, body mass index, gender, gait, fitness level, fear of heights, rushing tendency, experience level, experience time, or any combination thereof.

Clause 87: A computer program product for human-centered safety using physiological indicators to detect at least one potential hazard, the computer program product comprising at least one non-transitory computer-readable medium including one or more instructions that, when executed by at least one processor, cause the at least one processor to: receive physiological data associated with a plurality of physiological parameters of a worker from a wearable device of the worker; monitor the physiological data to detect at least one potential hazard based on a hazard classifier, the hazard classifier comprising at least one machine learning model trained based on historical physiological data associated with the plurality of physiological parameters; and communicate at least one communication based on the at least one potential hazard.

Clause 88: The computer program product of clause 87, wherein the plurality of physiological parameters comprise at least one of heart rate, body temperature, blood pressure, galvanic skin response, cardiac arrhythmia, breathing rate, blood oxygen level, gait, motion, body motion, limb motion, sounds, vibrations, a measurable quantity from the body of the worker, or any combination thereof.

Clause 89: The computer program product of clause 87 or clause 88, wherein the physiological data comprises at least one of accelerometer data, blood volume pulse data, electrodermal activity data, body temperature data, gyroscope data, heart rate data, blood pressure data, galvanic skin response data, cardiac arrhythmia data, breathing rate data, blood oxygen level data, gait data, acoustic data, vibration data, sound data, motion data, body motion data, limb motion data, or any combination thereof.

Clause 90: The computer program product of any of clauses 87-89, wherein the wearable device comprises a plurality of sensors associated with the plurality of physiological parameters.

Clause 91: The computer program product of any of clauses 87-90, wherein the plurality of sensors comprise at least one of an accelerometer, a blood volume pulse sensor, an electrodermal activity sensor, a body temperature sensor, a gyroscope, a heart rate sensor, a blood pressure sensor, a galvanic skin response sensor, a cardiac arrhythmia sensor, a breathing rate sensor, a blood oxygen level sensor, a gait sensor, an acoustic sensor, a vibration sensor, a microphone, a motion sensor, or any combination thereof.

Clause 92: The computer program product of any of clauses 87-91, wherein the physiological data comprises raw sensor data from the plurality of sensors.

Clause 93: The computer program product of any of clauses 87-92, wherein the at least one machine learning model comprises at least one of a random forest model, a decision tree model, a neural network, a recurrent neural network, a long short-term memory model, an autoregressive integrated moving average, or any combination thereof.

Clause 94: The computer program product of any of clauses 87-93, wherein the hazard classifier comprises a plurality of machine learning models, each machine learning model of the plurality of machine learning models associated with a respective potential hazard of a plurality of potential hazards.

Clause 95: The computer program product of any of clauses 87-94, wherein the at least one potential hazard comprises at least one of a slip, a trip, a fall, heat stress, impairment, a hazardous substance, a hazardous environment, a distraction, violence, fatigue, contact with at least one object, a driving accident, a lack of oxygen, or any combination thereof.

Clause 96: The computer program product of any of clauses 87-95, wherein the at least one potential hazard comprises at least one of a current hazard, a future hazard, or any combination thereof.

Clause 97: The computer program product of any of clauses 87-96, wherein the wearable device comprises at least one of a wrist-wearable device, a torso-wearable device, a garment configured to be worn by the worker, or any combination thereof.

Clause 98: The computer program product of any of clauses 87-97, wherein communicating the at least one communication comprises at least one of displaying an alert message to the worker, playing an audible alert message to the worker, generating a haptic alert, displaying a prompt to the worker, communicating at least one message to a remote computer system, communicating at least one message to a safety personnel computing device, or any combination thereof.

Clause 99: The computer program product of any of clauses 87-98, wherein the at least one processor comprises at least one remote computer system processor of a remote computer system remote from the worker, wherein communicating the at least one communication comprises communicating an alert message to at least one of the wearable device, a safety personnel computing device, or any combination thereof.

Clause 100: The computer program product of any of clauses 87-99, wherein the at least one processor comprises at least one mobile device processor of a mobile device proximate to the worker, wherein the one or more instructions, when executed by the at least one processor, further cause the at least one processor to: communicate the physiological data to a remote computer system.

Clause 101: The computer program product of any of clauses 87-100, wherein the remote computer system is configured to: receive the historical physiological data; train the at least one machine learning model of the hazard classifier based on the historical physiological data; and communicate the trained hazard classifier to the mobile device.

Clause 102: The computer program product of any of clauses 87-101, wherein the remote computer system is configured to: receive the physiological data.

Clause 103: The computer program product of any of clauses 87-102, wherein the remote computer system is configured to: retrain the at least one machine learning model of the hazard classifier based on the physiological data.

Clause 104: The computer program product of any of clauses 87-103, wherein the remote computer system is configured to: communicate the retrained hazard classifier to the mobile device.

Clause 105: The computer program product of any of clauses 87-104, wherein the remote computer system is configured to: communicate at least one further communication to a safety personnel computing device based on receiving the physiological data.

Clause 106: The computer program product of any of clauses 87-105, wherein the safety personnel computing device is configured to: display at least one graphical user interface based on the at least one further communication.

Clause 107: The computer program product of any of clauses 87-106, wherein displaying the at least one graphical user interface comprises at least one of: displaying an alert message; displaying location data associated with the at least one potential hazard; displaying at least one dashboard; or any combination thereof.

Clause 108: The computer program product of any of clauses 87-107, wherein the at least one dashboard comprises at least one of: at least one gauge graphical element; at least one bar graphical element; or any combination thereof.

Clause 109: The computer program product of any of clauses 87-108, wherein the at least one gauge graphical element comprises a plurality of gauge graphical elements comprising a first gauge graphical element associated with inherent risk of the at least one potential hazard, a second gauge graphical element associated with current risk of the at least one potential hazard, and a third gauge graphical element associated with future risk of the at least one potential hazard.

Clause 110: The computer program product of any of clauses 87-109, wherein the at least one bar graphical element comprises a plurality of bar graphical elements comprising a first subset of bar graphical elements associated with worker data of the worker, a second subset of bar graphical elements associated with at least one current potential hazard of the at least one potential hazard, and a third subset of bar graphical elements associated with at least one future potential hazard of the at least one potential hazard.

Clause 111: The computer program product of any of clauses 87-110, wherein monitoring the physiological data to detect the at least one potential hazard based on the hazard classifier comprises inputting the physiological data to the hazard classifier to generate at least one prediction associated with the at least one potential hazard.

Clause 112: The computer program product of any of clauses 87-111, wherein the one or more instructions, when executed by the at least one processor, further cause the at least one processor to: determine a risk level based on the at least one potential hazard, wherein communicating the at least one communication comprises communicating the at least one communication based on the risk level.

Clause 113: The computer program product of any of clauses 87-112, wherein the risk level comprises a risk level category of a plurality of risk level categories, the plurality of risk level categories comprising at least one of an individual risk level category, a department risk level category, a location risk level category, a mid-level risk level category, a corporate risk level category, or any combination thereof.

Clause 114: The computer program product of any of clauses 87-113, wherein the hazard classifier is calibrated based on worker data of the worker.

Clause 115: The computer program product of any of clauses 87-114, wherein the worker data of the worker comprises at least one of age, height, weight, body mass index, gender, gait, fitness level, fear of heights, rushing tendency, experience level, experience time, or any combination thereof.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Additional advantages and details are explained in greater detail below with reference to the non-limiting, exemplary embodiments that are illustrated in the accompanying schematic figures, in which:

FIG. 4A is a table of example causes of different types of safety incidents, according to some non-limiting embodiments or aspects;

FIG. 4B includes two tables of example physiological indicators associated with causes of different types of safety incidents, according to some non-limiting embodiments or aspects;

FIG. 5A is a table of example physiological indicators and potential hazards, according to some non-limiting embodiments or aspects;

DESCRIPTION OF THE PREFERRED EMBODIMENTS

Figure 1A:
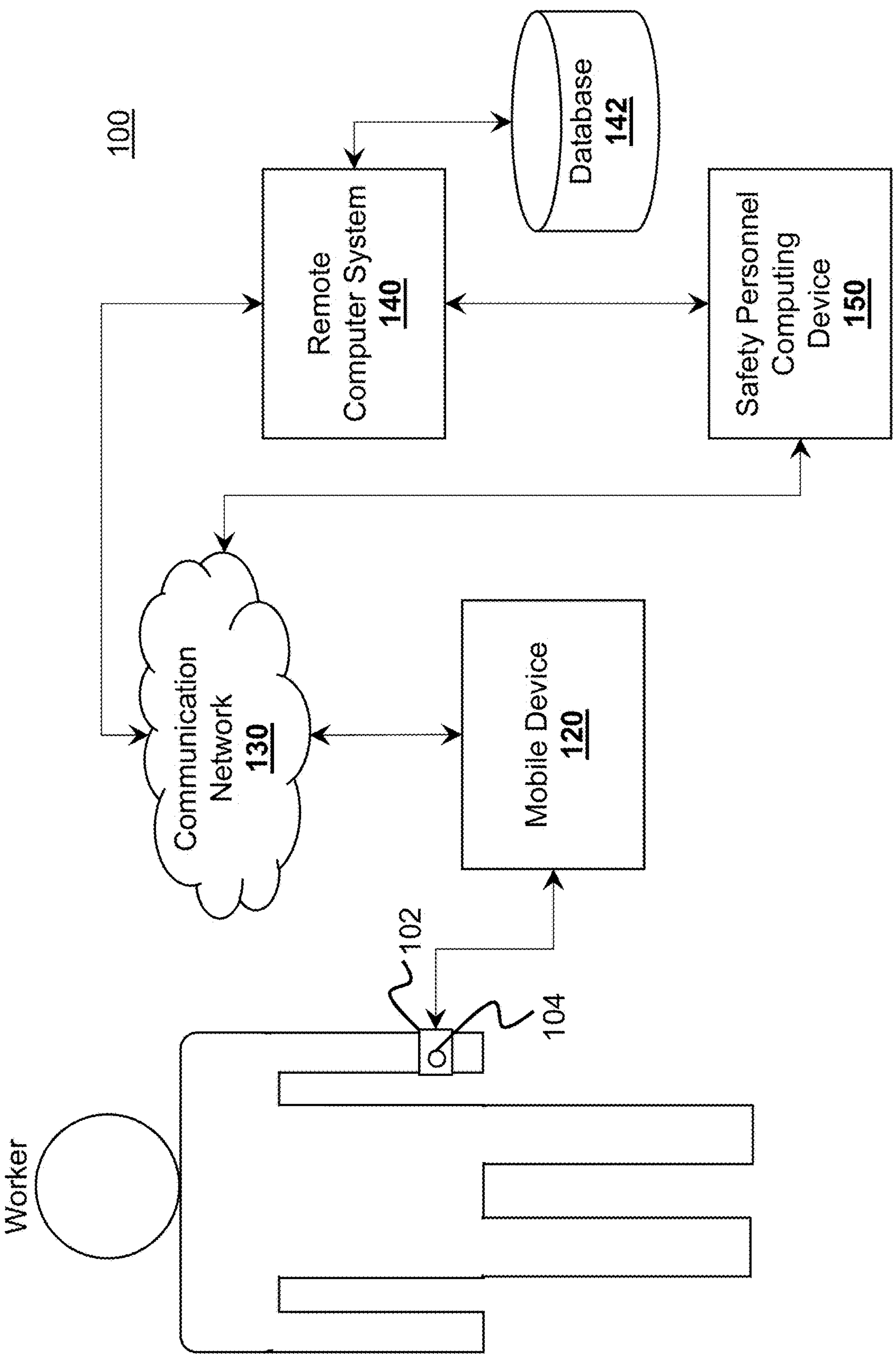
FIGS. 1A-1D are schematic diagrams of an example system for human-centered safety using physiological indicators to identify and/or predict potential hazards, according to some non-limiting embodiments or aspects.
Figure 1B:
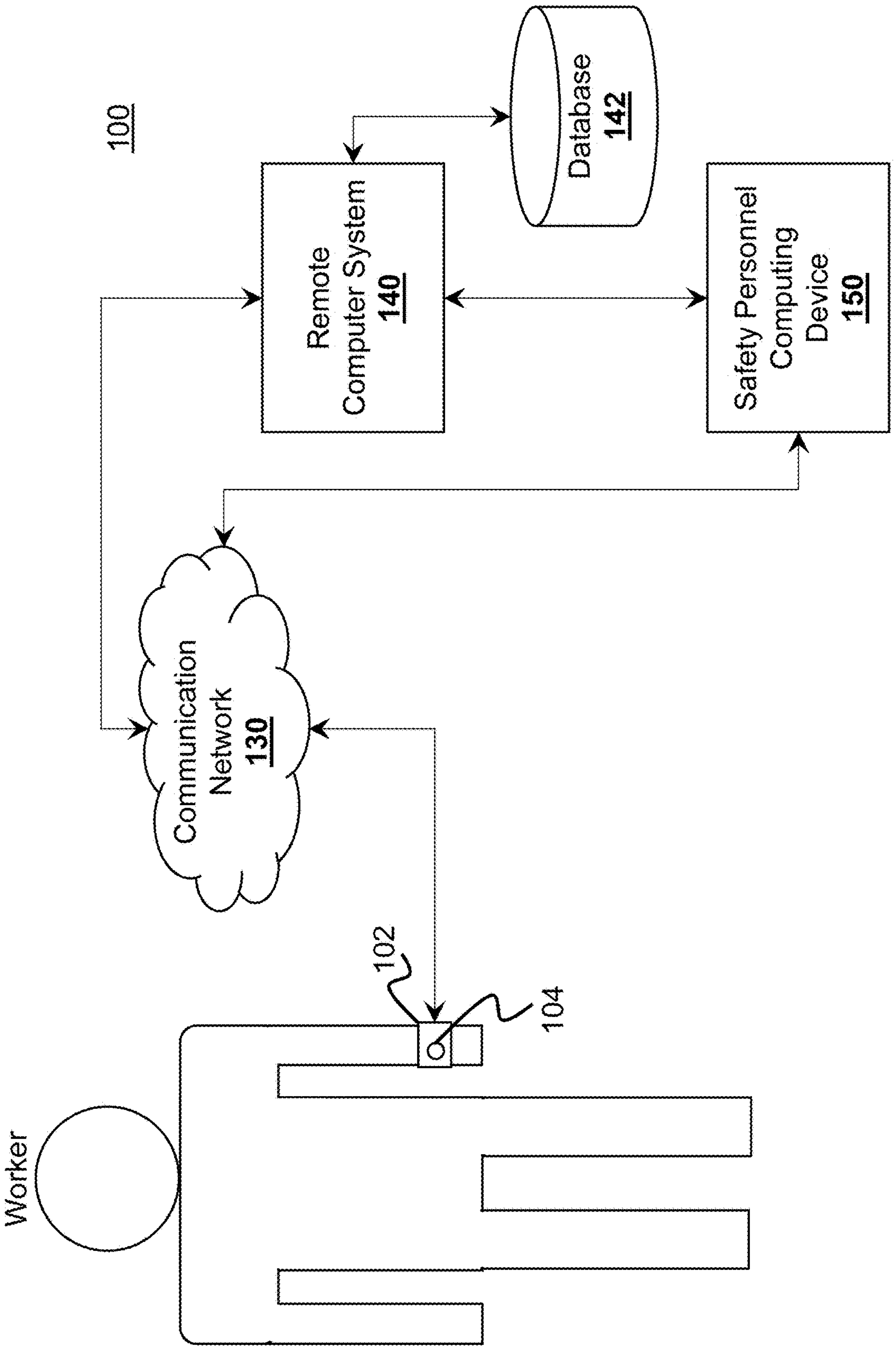
Figure 1C:
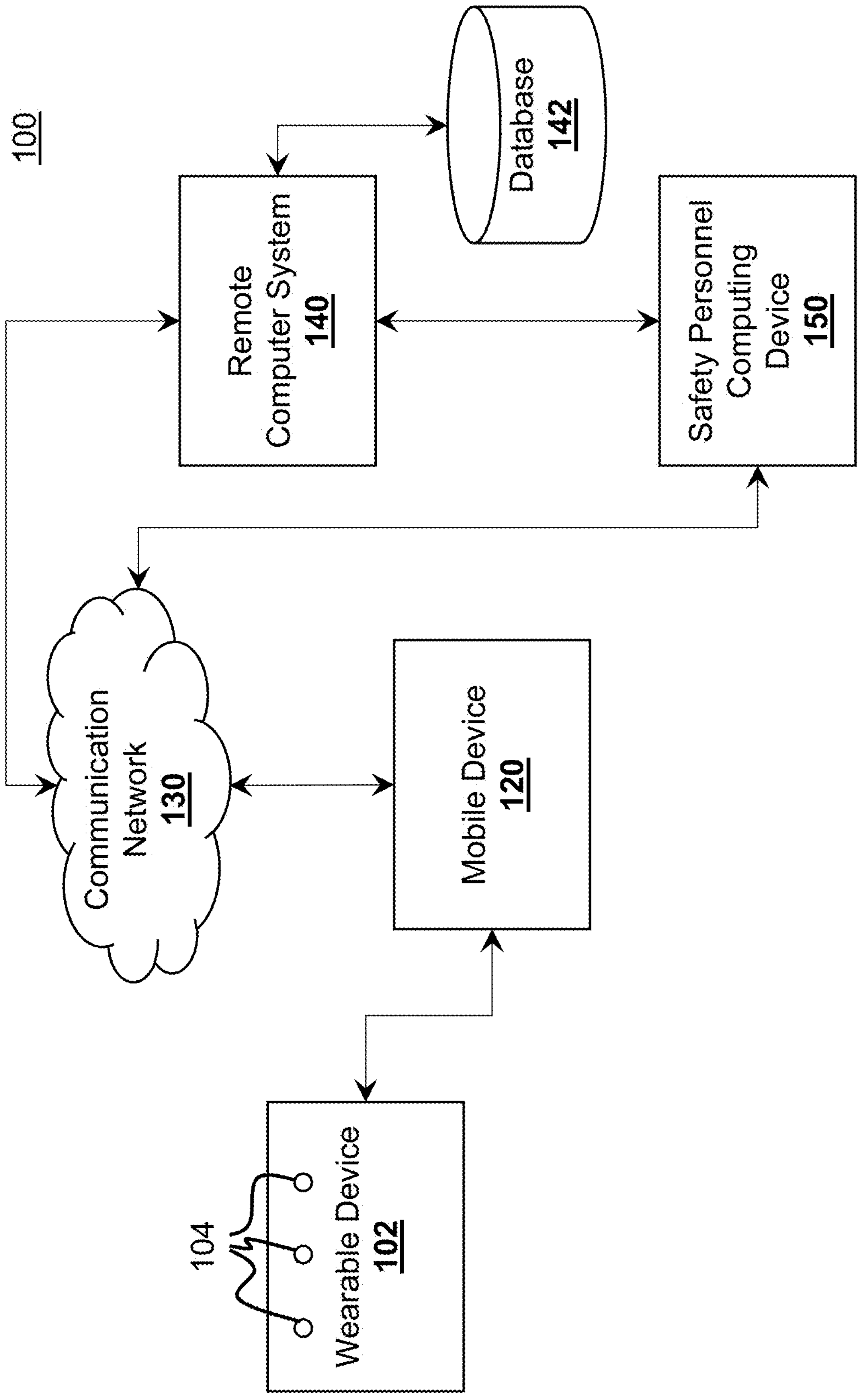
Figure 1D:
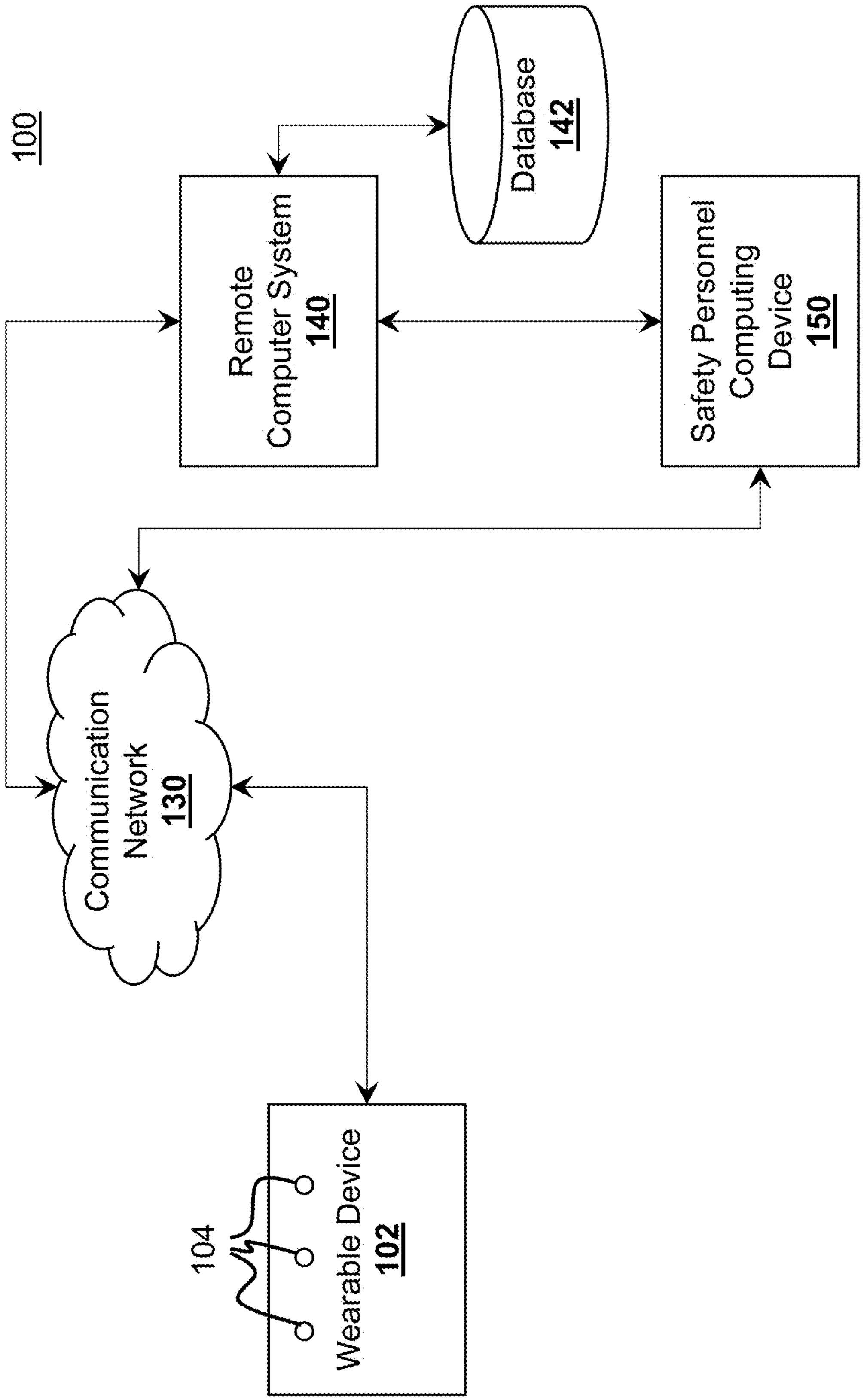

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments or aspects of the present disclosure are directed to systems, methods, and computer program products for human-centered safety using physiological indicators to identify and/or predict potential hazards. For example, non-limiting embodiments or aspects of the disclosed subject matter provide receiving physiological data associated with a plurality of physiological parameters of a worker from a wearable device of the worker, monitoring the physiological data to detect at least one potential hazard based on a hazard classifier, and/or communicating at least one communication based on the physiological data and/or the potential hazard(s). The hazard classifier may include at least one machine learning model trained based on historical physiological data associated with the plurality of physiological parameters and/or may be calibrated based on worker data associated with the worker. Such embodiments or aspects provide using physiological data obtained from the worker's body to detect potential hazards (e.g., the human body as a sensor). As such, the aforementioned embodiments or aspects enable detection of whether a potential hazard is present (e.g., a current hazard), prediction of potential hazards (e.g., a future hazard), and response to a potential hazard (e.g., alerts, communication with safety personnel, remediation, etc.). For example, wearable technology (e.g., a wearable device) may be used to collect the physiological data. Additionally, the hazard classifier (e.g., included trained machine learning models) may detect potential hazards (e.g., based on combinations as to which physiological parameters changed and/or the rate of change thereof to predict which potential hazard is present). In addition, since every human is unique and may react differently to hazards (e.g., based on their personal attributes, such as physical and mental predispositions, baselines physiological parameters, and calibration), training based on historical physiological data from and/or calibration specific to the individual (e.g., the worker) may improve performance of the hazard classifier. In some non-limiting embodiments or aspects, other data such as near misses, environmental factors, location, changes to a group, any combination thereof, and/or the like may supplement the physiological data (e.g., may be input to the hazard classifier in addition to the physiological data to generate the output/detected potential hazards). Moreover, unlike certain safety systems that rely on external or environmental detectors or monitors to detect hazards in a workplace, the aforementioned embodiments or aspects of the present disclosure monitor the person (e.g., worker) rather than the environment (e.g., by using the wearable device(s) to collect data about a person's physiology and predictive models, such as machine learning models, to predict potential hazards, including detecting potential hazards before the occurrence thereof). Furthermore, in contrast to certain safety systems that rely on specific detectors or monitors for each known hazard, that do not protect a person from all hazards that can occur or be present, that can fail or be forgotten, and/or that can rely on a universal standard as a threshold for alarm triggers for all users and are not specific to each individual, the aforementioned embodiments or aspects of the present disclosure utilize the body's ability (e.g., reactions to potential hazards) in order to detect (e.g., identify, predict, and/or measure) potential hazards. For example, by using predictive analytics and/or machine learning, the aforementioned embodiments or aspects of the present disclosure can predict a potential hazard before it occurs. Further, the aforementioned embodiments or aspects of the present disclosure treats each person as a unique individual whose response to potential hazards may be unique situations specific to that person (e.g., by training machine learning models and/or calibrating the hazard classifier based on the specific worker). In some non-limiting embodiments or aspects, other indicators such as location or group dynamics may be used to further assess the situation (e.g., potential hazard). As such, individual (e.g., external or environmental) hazard monitors and detectors may be replaced by the aforementioned embodiments or aspects of the present disclosure, which provide a more cost effective, accurate, comprehensive (e.g., not limited to specific hazards) solution to monitor for all hazards a person (e.g., worker) may encounter in the workplace. The aforementioned embodiments or aspects of the present disclosure provide a step-change that is human-centered and helps to reduce (e.g., eliminate) worker injuries and fatalities. For example, aforementioned embodiments or aspects of the present disclosure protects a worker in a complete way (e.g., by detecting all possible potential hazards based on the worker's physiological responses). As such, accidents may be prevented and lives may be saved in a comprehensive way. For example, the aforementioned embodiments or aspects of the present disclosure use the human body's physiological reactions (e.g., the human body as a sensor) to collect safety data (e.g., physiological data, which may be used to detect potential hazards that impact safety), focuses on the worker and not just the worker's environment (e.g., human-centered), automates data collection processes (e.g., physiological data may be continually available from and/or communicated by the wearable device), predicts and/or prevents accidents (e.g., using machine learning models to detect potential hazards and/or automatically generate alerts upon detection of the potential hazards), enables a connected workforce (e.g., the data and feedback may be real-time and/or preventive actions may be initiated to prevent accidents before they occur), connects safety personnel (e.g., managers and/or the like) to the people (e.g., workers) they work to protect. As such, the worker benefits from a safer work environment and is not encumbered by the rigors of a manual safety program that interrupts a work-day, and the employer realizes reduced costs in the areas of worker's compensation claims, insurance costs, and lost time in the workplace.

FIGS. 1A-1D depicts an example system 100 for human-centered safety using physiological indicators to identify and/or predict potential hazards, according to some non-limiting embodiments or aspects. For example, system 100 may include wearable device 102, sensor 104, mobile device 120, communication network 130, remote computer system 140, database 142, and safety personnel computing device 150.

Wearable device 102 may include at least one device configured to be worn by a worker. For example, wearable device 102 may include at least one of a wrist-wearable device, a torso-wearable device, a garment configured to be worn by the worker, or any combination thereof. In some non-limiting embodiments or aspects, wearable device 102 may include one or more devices capable of receiving information from and/or communicating information to mobile device 120, remote computer system 140, and/or safety personnel computing device 150 (e.g., directly, indirectly via communication network 130, and/or the like). In some non-limiting embodiments or aspects, wearable device 102 may include at least one computing device, as described herein.

In some non-limiting embodiments or aspects, wearable device 102 may include at least one sensor 104 (e.g., a plurality of sensors 104). For example, wearable device 102 may include a plurality of sensors 104 associated with a plurality of physiological parameters. In some non-limiting embodiments or aspects, the plurality of sensors may include at least one of an accelerometer, a blood volume pulse sensor, an electrodermal activity sensor, a body temperature sensor, a gyroscope, a heart rate sensor, a blood pressure sensor, a galvanic skin response sensor, a cardiac arrhythmia sensor, a breathing rate sensor, a blood oxygen level sensor, a gait sensor, an acoustic sensor, a vibration sensor, a microphone, a motion sensor, any combination thereof, and/or the like. Additionally or alternatively, the plurality of physiological parameters may include at least one of heart rate, body temperature, blood pressure, galvanic skin response, cardiac arrhythmia, breathing rate, blood oxygen level, gait, motion (e.g., body motion, limb motion, and/or the like), sounds (e.g., body sounds, speech by the worker, utterances by the worker, and/or the like), vibrations, any other measurable quantity (e.g., reaction, impulse, and/or the like) from the body of the worker, any combination thereof, and/or the like. In some non-limiting embodiments or aspects, wearable device 102 may receive physiological data from and/or generate physiological data with (e.g., using) sensor(s) 104. For example, the physiological data may be associated with the plurality of physiological parameters of the worker. In some non-limiting embodiments or aspects, the physiological data may include time-series data comprising a time series of data points associated with each physiological parameter. In some non-limiting embodiments or aspects, the physiological data may include at least one of accelerometer data, blood volume pulse data, electrodermal activity data, body temperature data, gyroscope data, heart rate data, blood pressure data, galvanic skin response data, cardiac arrhythmia data, breathing rate data, blood oxygen level data, gait data, acoustic data, vibration data, sound data, motion data (e.g., body motion data, limb motion data, and/or the like), any combination thereof, and/or the like. In some non-limiting embodiments or aspects, the physiological data may include raw sensor data from sensor(s) 104. Additionally or alternatively, at least some of (e.g., all of) the physiological data may include derived physiological data determined (e.g., by wearable device 102) based on the raw sensor data from sensor(s) 104. In some non-limiting embodiments or aspects, wearable device 102 may communicate physiological data (e.g., raw sensor data, derived physiological data, and/or the like) to mobile device 120 and/or remote computer system 140 (e.g., directly, indirectly via communication network 130, and/or the like). For example, wearable device 102 may communicate raw sensor data to mobile device 120 and/or remote computer system 140, which may allow for communicating such data without delay (e.g., compared to the delay introduced by determining derived physiological data before communicating derived physiological data). As such, the data communicated to and/or received by mobile device 120 and/or remote computer system 140 may be ensured to be as up-to-date and real-time as possible.

In some non-limiting embodiments or aspects, wearable device 102 may communicate location data and/or environmental data together with the physiological data. For example, wearable device 102 may include a location sensor (e.g., a global positioning system (GPS) device; a device configured to detect location based on wireless networks, such as cellular networks, Wi-Fi networks, and/or the like; any combination thereof, and/or the like) to generate the location data. Additionally or alternatively, at least one of sensor(s) 104 may include an environmental sensor to generate environmental data.

In some non-limiting embodiments or aspects, wearable device 102 may monitor the physiological data (and/or location and/or environmental data) to detect at least one potential hazard based on a hazard classifier, as described herein. For example, the hazard classifier may include at least one machine learning model trained based on historical physiological data associated with the plurality of physiological parameters. In some non-limiting embodiments or aspects, wearable device 102 may communicate at least one communication based on the at least one potential hazard. For example, communicating the at least one communication may include displaying an alert message to the worker, playing an audible alert message to the worker, generating a haptic alert (e.g., a vibration), displaying a prompt to the worker, any combination thereof, and/or the like. Additionally or alternatively, communicating the at least one communication may include communicating at least one message to remote computer system 140, communicating at least one message to a safety personnel computing device 150, any combination thereof, and/or the like.

In some non-limiting embodiments or aspects, a prompt (e.g., displayed to the worker) may include questions such as "Did you experience an incident or near miss?", "Are you ok?", "Do you need assistance/medical attention?", any combination thereof, and/or the like.

In some non-limiting embodiments or aspects, motion (e.g., body motion, limb motion, and/or the like) may be associated with a potential hazard (e.g., when a person comes into contact with a current hazard, body movements may indicate the presence of the hazard). For example, during a slip, the worker's arms and/or hands may flail as a reaction to regain balance. As another example, if the worker comes into contact with an object (e.g., the worker is hit in the head by the object), the worker may rub the spot on the worker's body (e.g., the worker's head) where the contact occurred.

In some non-limiting embodiments or aspects, sounds (e.g., from the worker's body) may be associated with a potential hazard. For example, when a worker trips, the worker may make a sound in reaction to the trip. Example sounds may include the worker saying something (e.g., ouch), uttering something (e.g., a grunt, groan, or moan), or a sound resulting from the worker's body (or a portion thereof) making contact with the ground and/or an object.

Mobile device 120 may include at least one mobile device proximate to the worker. For example, mobile device 120 may include a cellular phone (e.g., a smartphone), a portable computer (e.g., a laptop computer, a tablet computer, and/or the like), a personal digital assistant (PDA), and/or other like devices. In some non-limiting embodiments or aspects, mobile device 120 may include one or more devices capable of receiving information from and/or communicating information to wearable device 102, remote computer system 140, and/or safety personnel computing device 150 (e.g., directly, indirectly via communication network 130, and/or the like). In some non-limiting embodiments or aspects, mobile device 120 may include at least one computing device, as described herein.

In some non-limiting embodiments or aspects, mobile device 120 may receive physiological data (e.g., associated with a plurality of physiological parameters of the worker) from wearable device 102. In some non-limiting embodiments or aspects, mobile device 120 may receive location data and/or environmental data together with the physiological data. In some non-limiting embodiments or aspects, mobile device 120 may communicate the physiological data (e.g., received from wearable device 102) to remote computer system 140. In some non-limiting embodiments or aspects, mobile device 120 may communicate location data and/or environmental data together with the physiological data.

In some non-limiting embodiments or aspects, mobile device 120 may include a location sensor to generate the location data. Additionally or alternatively, mobile device 120 may include at least one environmental sensor to generate environmental data.

In some non-limiting embodiments or aspects, mobile device 120 may monitor the physiological data (and/or location and/or environmental data) to detect at least one potential hazard based on a hazard classifier, as described herein. For example, the hazard classifier may include at least one machine learning model trained based on historical physiological data associated with the plurality of physiological parameters, as described herein. In some non-limiting embodiments or aspects, mobile device 120 may communicate at least one communication based on the at least one potential hazard. For example, communicating the at least one communication may include displaying an alert message to the worker, playing an audible alert message to the worker, generating a haptic alert (e.g., a vibration), displaying a prompt to the worker, any combination thereof, and/or the like. Additionally or alternatively, communicating the at least one communication may include communicating at least one message to remote computer system 140, communicating at least one message to a safety personnel computing device 150, any combination thereof, and/or the like.

Remote computer system 140 may include at least one computing device remote from the worker. For example, remote computer system 140 may include at least one computing device, such as a server, a group of servers, a desktop computer or other form of non-mobile computer, a portable computer, any combination thereof, and/or the like. In some non-limiting embodiments or aspects, remote computer system 140 may include one or more devices capable of receiving information from and/or communicating information to wearable device 102, mobile device 120, and/or safety personnel computing device 150 (e.g., directly, indirectly via communication network 130, and/or the like). In some non-limiting embodiments or aspects, remote computer system 140 may be in communication with at least one data storage device (e.g., database 142 and/or the like), which may be local or remote to remote computer system 140. In some non-limiting embodiments or aspects, remote computer system 140 may be capable of receiving information from, storing information in, communicating information to, or searching information stored in the data storage device (e.g., database 142 and/or the like).

In some non-limiting embodiments or aspects, remote computer system 140 may receive physiological data (e.g., associated with a plurality of physiological parameters of the worker) from wearable device 102 and/or mobile device 120. In some non-limiting embodiments or aspects, remote computer system 140 may receive location data and/or environmental data together with the physiological data. In some non-limiting embodiments or aspects, remote computer system 140 may monitor the physiological data (and/or location and/or environmental data) to detect at least one potential hazard based on a hazard classifier, as described herein. For example, the hazard classifier may include at least one machine learning model trained based on historical physiological data associated with the plurality of physiological parameters, as described herein. In some non-limiting embodiments or aspects, remote computer system 140 may communicate at least one communication based on the at least one potential hazard. For example, communicating the at least one communication may include communicating at least one message (e.g., an alert message, a prompt, and/or the like) to wearable device 102 and/or mobile device 120, communicating at least one message (e.g., an alert message and/or the like) to a safety personnel computing device 150, any combination thereof, and/or the like.

In some non-limiting embodiments or aspects, remote computer system 140 may store the physiological data in database 142. Additionally or alternatively, remote computer system 140 may store potential hazard data associated with the potential hazard(s) in database 142.

Safety personnel computing device 150 may include one or more devices associated with safety personnel (e.g., at least one individual responsible for overseeing safety, such as a manager, a safety coordinator, a safety professional, and/or the like). For example, safety personnel computing device 150 may include at least one computing device, such as a mobile device, a portable computer, a desktop computer or other form of non-mobile computer, a server, a group of servers, any combination thereof, and/or the like. In some non-limiting embodiments or aspects, safety personnel computing device 150 may include one or more devices capable of receiving information from and/or communicating information to wearable device 102, mobile device 120, and/or remote computer system 140 (e.g., directly, indirectly via communication network 130, and/or the like). In some embodiments non-limiting embodiments or aspects, safety personnel computing device 150 may be part of the remote computer system 140. Additionally or alternatively, safety personnel computing device 150 may be local or remote to the remote computer system 140. In some non-limiting embodiments or aspects, safety personnel computing device 150 may be local or remote to the worker (e.g., the worker wearing wearable device 102). In some non-limiting embodiments or aspects, safety personnel computing device 150 may include at least one input component that permits safety personnel computing device 150 to receive information, such as via user input (e.g., a touch screen display, a keyboard, a keypad, a mouse, a button, a switch, a microphone, a camera, and/or the like). Additionally or alternatively, safety personnel computing device 150 may include at least one output component that provides output information from safety personnel computing device 150 (e.g., a display, a touch screen, a speaker, and/or the like).

Communication network 130 may include one or more wired and/or wireless networks. For example, communication network 130 may include a cellular network (e.g., a long-term evolution (LTE) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

In some non-limiting embodiments or aspects, the machine learning model(s) of the hazard classifier may include at least one of a random forest model, a decision tree model, a neural network, a recurrent neural network, a long short-term memory model, an autoregressive integrated moving average, any combination thereof, and/or the like. Additionally or alternatively, the machine learning model(s) of the hazard classifier may include at least one of AbstractClassifier, AdaBoostM1, Additive Regression, AttributeSelectedClassifier, Bagging, BayesNet, BayesNetGenerator, BIFReader, ClassificationViaRegression, CostSensitiveClassifier, CVParameterSelection, DecisionStump, DecisionTable, EditableBayesNet, FilteredClassifier, GaussianProcesses, GeneralRegression, HoeffdingTree, IBk, InputMappedClassifier, IteratedSingleClassifierEnhancer, IterativeClassifierOptimizer, J48, JRip, KStar, LinearRegression, LMT, LMTNode, Logistic, LogisticBase, LogitBoost, LWL, M5Base, M5P, M5Rules, MultiClassClassifier, MultiClassClassifierUpdateable, MultilayerPerceptron, MultipleClassifiersCombiner, MultiScheme, NaiveBayes, NaiveBayesMultinomial, NaiveBayesMultinomialText, NaiveBayesMultinomialUpdateable, NaiveBayesUpdateable, NeuralNetwork, OneR, ParallelIteratedSingleClassifierEnhancer, ParallelMultipleClassifiersCombiner, PART, PMMLClassifier, PreConstructedLinearModel, RandomCommittee, Random Forest, RandomizableClassifier, RandomizableFilteredClassifier, RandomizableIteratedSingleClassifierEnhancer, RandomizableMultipleClassifiersCombiner, RandomizableParallelIteratedSingleClassifierEnhancer, RandomizableParallelMultipleClassifiersCombiner, RandomizableSingleClassifierEnhancer, RandomSubSpace, RandomTree, Regression, RegressionByDiscretization, REPTree, RuleNode, RuleSetModel, SerializedClassifier, SGD, SGDText, SimpleLinearRegression, SimpleLogistic, SingleClassifierEnhancer, SMO, SMOreg, Stacking, SupportVectorMachineModel, TreeModel, Vote, VotedPerceptron, WeightedInstancesHandlerWrapper, ZeroR, any combination thereof, and/or the like. In some non-limiting embodiments or aspects, the hazard classifier may include analytical models and/or algorithms, statistical models and/or algorithms, regression models and/or algorithms, rules, configurations, calibration settings, and/or the like (e.g., in addition to or in lieu of the machine learning models).

In some non-limiting embodiments or aspects, the hazard classifier may include a plurality of machine learning models. For example, each machine learning model may be associated with a respective potential hazard of a plurality of potential hazards.

In some non-limiting embodiments or aspects, the potential hazard(s) may include at least one of a slip, a trip, a fall, heat stress, impairment, a hazardous substance, a hazardous environment, a distraction, violence, fatigue, contact with at least one object, a driving accident, a lack of oxygen, a near miss of any of the foregoing, any combination thereof, and/or the like. For example, a hazardous substance may include a gas, a fluid, and/or the like that is hazardous to a worker. As another example, a hazardous environment may include smoke, fire, extreme heat, extreme cold, and/or the like. In some non-limiting embodiments or aspects, a near miss may include a hazard (e.g., a current hazard) that fortuitously do not result in harm.

In some non-limiting embodiments or aspects, the potential hazard(s) may include a current hazard, a future hazard, or any combination thereof. In some non-limiting embodiments or aspects, a future hazard may be associated with one or more current hazards. For example, one or more current slips, trips, or falls may be associated with a future hazard of increased risk of a slip, trip, or fall at a location (e.g., based on location data) associated with the current slip(s), trip(s), or fall(s).

In some non-limiting embodiments or aspects, remote computer system 140 may receive (e.g., access, retrieve, and/or the like) historical physiological data (e.g., in database 142 and/or the like). Additionally or alternatively, remote computer system 140 may train the at least one machine learning model of the hazard classifier based on the historical physiological data, as described herein. In some non-limiting embodiments or aspects, remote computer system 140 may communicate the trained hazard classifier to mobile device 120 and/or wearable device 102.

In some non-limiting embodiments or aspects, remote computer system 140 may train the hazard classifier (e.g., the machine learning model(s) thereof) by generating predicted potential hazards (e.g., a prediction, a classification, a confidence score, and/or the like) based on the historical physiological data (or a first subset thereof, e.g., a training subset). For example, the historical physiological data may include historical time-series data associated with the plurality of physiological parameters (e.g., the worker, of a plurality of workers, and/or the like), and remote computer system 140 may input the historical time-series data (e.g., of the training subset of the historical physiological data) into the hazard classifier to generate at least one predicted potential hazard (or the lack of such predicted potential hazard). The predicted potential hazard(s) may be compared (e.g., by the remote computer system 140) to labels (e.g., known potential hazards identified in the dataset, which may be provided by safety personnel and/or the like) for the respective portion of the historical time-series data. Remote computer system 140 may determine (e.g., calculate) a loss (e.g., error and/or the like) based on the predicted potential hazard(s) and the known potential hazard(s). For example, remote computer system 140 may calculate the loss based on the predicted potential hazard(s), the labels, and/or at least one loss function (e.g., an objective function, an error calculation, a prediction error, a contrastive loss, and/or the like). In some non-limiting embodiments or aspects, remote computer system 140 may update (e.g., adjust) the parameters (e.g., weights, connection values, and/or the like) of the hazard classifier (and/or machine learning models thereof) based on the loss (e.g., using back propagation, gradient calculations, and/or the like).

In some non-limiting embodiments or aspects, remote computer system 140 may receive the physiological data associated with the worker from wearable device 102 and/or mobile device 120. In some non-limiting embodiments or aspects, remote computer system 140 may retrain the hazard classifier (e.g., the machine learning model(s) thereof) based on the physiological data. For example, retraining may be similar to training except at least some of the input data may be new and/or different (e.g., the physiological data associated with the worker received from wearable device 102 and/or mobile device 120 and/or the like). In some non-limiting embodiments or aspects, remote computer system 140 may communicate the (retrained) hazard classifier to mobile device 120 and/or wearable device 102.

In some non-limiting embodiments or aspects, the hazard classifier may be calibrated based on the individual worker (e.g., worker data of the worker), as described herein. In some non-limiting embodiments or aspects, the hazard classifier may be calibrated based on feature engineering, which may include addition to, deletion of a portion of, aggregation of, combination of, and/or mutation of input data (e.g., the physiological data) to improve training of the machine learning model(s) and/or to improve performance of the trained machine learning model(s). In some non-limiting embodiments or aspects, the engineered features may include aggregations, such as averages, maximum values (e.g., in the dataset), minimum values (e.g., in the input data), differences in values, counts, sums, any combination thereof, and/or the like. In some non-limiting embodiments or aspects, calibration may enable the hazard classifier to be customized to the specific worker. For example, if a first worker's resting heart rate is 65 beats per minute (BPM) and a second worker's resting heart rate is 86 BPM, rather than using the raw value of heartrate for each worker, the hazard classifier may be calibrated to use the difference between the maximum heart rate and the minimum heart rate for each individual worker over a period-of-time, which may remove the effect of an individual worker having different a different resting heart rate than other workers. As such, the difference between the maximum heart rate and the minimum heart rate for the individual worker over the period-of-time may be an engineered feature that may be used in the hazard classifier instead of just raw values.

In some non-limiting embodiments or aspects, remote computer system 140 may train at least one first machine learning model (e.g., a teacher model) based on the historical physiological data, as described herein. Additionally or alternatively, remote computer system 140 may train at least one second machine learning model (e.g., a student model) based on the first machine learning model. For example, the student model may be relatively smaller and/or less complex than the teacher model. In some non-limiting embodiments or aspects, remote computer system 140 may use the teacher model as the hazard classifier of remote computer system 140 (e.g., to monitor physiological data to detect the potential hazard(s) by remote computer system 140). In some non-limiting embodiments or aspects, remote computer system 140 may communicate the student model to mobile device 120 and/or wearable device 102. For example, mobile device 120 and/or wearable device 102 may use the student model as the hazard classifier thereof (e.g., monitor physiological data to detect the potential hazard(s) by mobile device 120 and/or wearable device 102).

In some non-limiting embodiments or aspects, remote computer system 140 may communicate at least one communication to safety personnel computing device 150 based on receiving the physiological data and/or detecting the potential hazard(s). In some non-limiting embodiments or aspects, safety personnel computing device 150 may display at least one graphical user interface based on the communication(s) (e.g., from remote computer system 140), as described herein. For example, the graphical user interface may include at least one of an alert message, location data associated with the potential hazard(s), at least one dashboard, at least one action tracker, any combination thereof, and/or the like. In some non-limiting embodiments or aspects, the dashboard(s) may include at least one of a gauge graphical element; a bar graphical element; textual information regarding the worker, the potential hazard(s) (e.g., a current hazard, a future hazard, and/or the like), any combination thereof, and/or the like. For example, the gauge graphical element(s) may include a plurality of gauge graphical elements comprising a first gauge graphical element associated with inherent risk of the at least one potential hazard, a second gauge graphical element associated with current risk of the at least one potential hazard, and a third gauge graphical element associated with future risk of the at least one potential hazard. Additionally or alternatively, the bar graphical element(s) may include a plurality of bar graphical elements comprising a first subset of bar graphical elements associated with worker data of the worker, a second subset of bar graphical elements associated with at least one current potential hazard of the at least one potential hazard, and a third subset of bar graphical elements associated with at least one future potential hazard of the at least one potential hazard. In some non-limiting embodiments or aspects, the action tracker(s) may include graphical elements (e.g., text boxes, dropdown menus, tables, and/or the like) that allow safety personnel to input and/or track remediation actions (e.g., preventive actions, containment actions, assistance and/or medical intervention actions, any combination thereof, and/or the like) that are taken and/or performed (e.g., based on the information safety personnel receive from the graphical user interface, such as the dashboard(s) and/or the like). In some non-limiting embodiments or aspects, the graphical user interface may display action trackers and/or risk information (e.g., dashboards) from at least one risk level category (e.g., a plurality of risk level categories). For example, the risk level categories may include at least one of an individual risk level category, a department risk level category, a location risk level category, a mid-level risk level category, a corporate risk level category, or any combination thereof.

In some non-limiting embodiments or aspects, monitoring the physiological data to detect the at least one potential hazard based on the hazard classifier may include inputting the physiological data to the hazard classifier to generate at least one prediction associated with the at least one potential hazard (e.g., at least one predicted potential hazard). In some non-limiting embodiments or aspects, the prediction(s) associated with the potential hazard(s) may include a risk score. In some non-limiting embodiments or aspects, the risk score (e.g., for the worker) may be determined based on at least one of (e.g., all of) inherent risk, current risk, and future risk. For example, inherent risk may include a risk level based on worker data associated with the worker, which may include physical characteristics and/or other characteristics of the worker. Example worker data may include age, height, weight, body mass index, gender, gait, fitness level, fear of heights, rushing tendency, experience level, experience time (e.g., time on the job), any combination thereof, and/or the like. Current risk may include a risk level based on current physiological data, e.g., at least one predicted current hazard(s) and/or a score associated therewith (e.g., output of the machine learning model(s) for each potential hazard, confidence score for each potential hazard, and/or the like). Future risk may include a risk level based on at least one predicted current hazard(s) and/or a score associated therewith (e.g., output of the machine learning model(s) for each future hazard, confidence score for each future hazard, and/or the like). In some non-limiting embodiments or aspects, risk score may be correlated with the level of risk. For example, a high risk score may be associated with a high level of risk and a low risk score may be associated with a low level of risk. In some non-limiting embodiments or aspects, risk score may be negatively correlated with the level of risk. For example, a high risk score may be associated with a low level of risk and a low risk score may be associated with a high level of risk.

In some non-limiting embodiments or aspects, a risk level may be determined (e.g., by remote computer system 140, mobile device 120, wearable device 102, and/or the like) based on the potential hazard(s) (e.g., current hazard(s), future hazard(s), and/or the like). Additionally or alternatively, communicating the communication(s) may include communicating at least one communication based on the risk level. In some non-limiting embodiments or aspects, the risk level may include and/or be based on the risk score, as described herein. In some non-limiting embodiments or aspects, the risk level may include a risk level category of a plurality of risk level categories, and the risk level category may be determined by the remote computer system 140, mobile device 120, and/or wearable device 102. For example, the plurality of risk level categories may include at least one of an individual risk level category, a department risk level category, a location risk level category, a mid-level risk level category, a corporate risk level category, or any combination thereof. In some non-limiting embodiments or aspects, the aforementioned risk level categories may be listed from lowest to highest priority, and determining the risk level category may include determining the risk level category based on the risk score.

The number and arrangement of systems and devices shown in FIGS. 1A-1D are provided as an example. There may be additional systems and/or devices, fewer systems and/or devices, different systems and/or devices, and/or differently arranged systems and/or devices than those shown in FIGS. 1A-1D. Furthermore, two or more systems or devices shown in FIGS. 1A-1D may be implemented within a single system or device, or a single system or device shown in FIGS. 1A-1D may be implemented as multiple, distributed systems or devices. Additionally or alternatively, a set of systems (e.g., one or more systems) or a set of devices (e.g., one or more devices) of system 100 may perform one or more functions described as being performed by another set of systems or another set of devices of system 100.

Figure 2A:
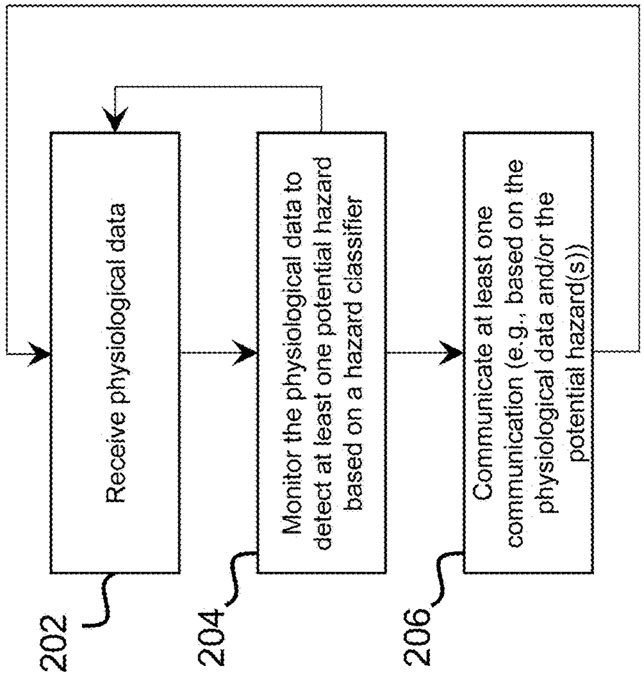
FIGS. 2A-2B are flow diagrams for example methods of human-centered safety using physiological indicators to identify and/or predict potential hazards, according to some non-limiting embodiments or aspects.

Referring now to FIG. 2A, shown is a process 200*a* for human-centered safety using physiological indicators to identify and/or predict potential hazards, according to some non-limiting embodiments or aspects. The steps shown in FIG. 2A are for example purposes only. It will be appreciated that additional, fewer, different, and/or a different order of steps may be used in non-limiting embodiments or aspects. In some non-limiting embodiments or aspects, one or more of the steps of process 200*a* may be performed (e.g., completely, partially, and/or the like) by wearable device 102, mobile device 120, and/or remote computer system 140. For example, one or more of the steps of process 200*a* may be performed (e.g., completely, partially, and/or the like) by wearable device 102. Additionally or alternatively, one or more of the steps of process 200*a* may be performed (e.g., completely, partially, and/or the like) by mobile device 120. Additionally or alternatively, one or more of the steps of process 200*a* may be performed (e.g., completely, partially, and/or the like) by remote computer system 140. In some non-limiting embodiments or aspects, one or more of the steps of process 200*a* may be performed (e.g., completely, partially, and/or the like) by another system, another device, another group of systems, or another group of devices, separate from or including wearable device 102, mobile device 120, and/or remote computer system 140, such as safety personnel computing device 150, database 142, and/or the like.

As shown in FIG. 2A, at step 202, process 200*a* may include receiving physiological data. For example, wearable device 102, mobile device 120, and/or remote computer system 140 may receive physiological data, as described herein.

In some non-limiting embodiments or aspects, wearable device 102 may include at least one sensor 104 (e.g., a plurality of sensors 104). For example, wearable device 102 may include a plurality of sensors 104 associated with a plurality of physiological parameters. In some non-limiting embodiments or aspects, the plurality of sensors may include at least one of an accelerometer, a blood volume pulse sensor, an electrodermal activity sensor, a body temperature sensor, a gyroscope, a heart rate sensor, a blood pressure sensor, a galvanic skin response sensor, a cardiac arrhythmia sensor, a breathing rate sensor, a blood oxygen level sensor, a gait sensor, an acoustic sensor, a vibration sensor, a microphone, a motion sensor, any combination thereof, and/or the like. Additionally or alternatively, the plurality of physiological parameters may include at least one of heart rate, body temperature, blood pressure, galvanic skin response, cardiac arrhythmia, breathing rate, blood oxygen level, gait, motion (e.g., body motion, limb motion, and/or the like), sounds (e.g., body sounds, speech by the worker, utterances by the worker, and/or the like), vibrations, any other measurable quantity (e.g., reaction, impulse, and/or the like) from the body of the worker, any combination thereof, and/or the like. In some non-limiting embodiments or aspects, wearable device 102 may receive physiological data from and/or generate physiological data with (e.g., using) sensor(s) 104. For example, the physiological data may be associated with the plurality of physiological parameters of the worker. In some non-limiting embodiments or aspects, the physiological data may include time-series data comprising a time series of data points associated with each physiological parameter. In some non-limiting embodiments or aspects, the physiological data may include at least one of accelerometer data, blood volume pulse data, electrodermal activity data, body temperature data, gyroscope data, heart rate data, blood pressure data, galvanic skin response data, cardiac arrhythmia data, breathing rate data, blood oxygen level data, gait data, acoustic data, vibration data, sound data, motion data (e.g., body motion data, limb motion data, and/or the like), any combination thereof, and/or the like. In some non-limiting embodiments or aspects, the physiological data may include raw sensor data from sensor(s) 104. Additionally or alternatively, at least some of (e.g., all of) the physiological data may include derived physiological data determined (e.g., by wearable device 102) based on the raw sensor data from sensor(s) 104. In some non-limiting embodiments or aspects, wearable device 102 may communicate physiological data (e.g., raw sensor data, derived physiological data, and/or the like) to mobile device 120 and/or remote computer system 140 (e.g., directly, indirectly via communication network 130, and/or the like). For example, wearable device 102 may communicate raw sensor data to mobile device 120 and/or remote computer system 140, which may allow for communicating such data without delay (e.g., compared to the delay introduced by determining derived physiological data before communicating derived physiological data). As such, the data communicated to and/or received by mobile device 120 and/or remote computer system 140 may be ensured to be as up-to-date and real-time as possible.

In some non-limiting embodiments or aspects, mobile device 120 may receive physiological data (e.g., associated with a plurality of physiological parameters of the worker) from wearable device 102. In some non-limiting embodiments or aspects, mobile device 120 may communicate the physiological data (e.g., received from wearable device 102) to remote computer system 140.

In some non-limiting embodiments or aspects, remote computer system 140 may receive physiological data (e.g., associated with a plurality of physiological parameters of the worker) from wearable device 102 and/or mobile device 120.

As shown in FIG. 2A, at step 204, process 200*a* may include monitoring the physiological data to detect at least one potential hazard based on a hazard classifier. For example, wearable device 102, mobile device 120, and/or remote computer system 140 may monitor the physiological data to detect at least one potential hazard based on a hazard classifier, as described herein.

In some non-limiting embodiments or aspects, wearable device 102 may monitor the physiological data to detect at least one potential hazard based on a hazard classifier, as described herein. For example, the hazard classifier may include at least one machine learning model trained based on historical physiological data associated with the plurality of physiological parameters.

In some non-limiting embodiments or aspects, mobile device 120 may monitor the physiological data to detect at least one potential hazard based on a hazard classifier, as described herein. For example, the hazard classifier may include at least one machine learning model trained based on historical physiological data associated with the plurality of physiological parameters, as described herein.

In some non-limiting embodiments or aspects, remote computer system 140 may monitor the physiological data to detect at least one potential hazard based on a hazard classifier, as described herein. For example, the hazard classifier may include at least one machine learning model trained based on historical physiological data associated with the plurality of physiological parameters, as described herein.

As shown in FIG. 2A, at step 206, process 200*a* may include communicating at least one communication (e.g., based on the physiological data and/or the potential hazard(s)). For example, wearable device 102, mobile device 120, and/or remote computer system 140 may communicate at least one communication (e.g., based on the physiological data and/or the potential hazard(s)), as described herein.

In some non-limiting embodiments or aspects, wearable device 102 may communicate at least one communication based on the at least one potential hazard. For example, communicating the at least one communication may include displaying an alert message to the worker, playing an audible alert message to the worker, generating a haptic alert (e.g., a vibration), displaying a prompt to the worker, any combination thereof, and/or the like. Additionally or alternatively, communicating the at least one communication may include communicating at least one message to remote computer system 140, communicating at least one message to a safety personnel computing device 150, any combination thereof, and/or the like.

In some non-limiting embodiments or aspects, mobile device 120 may communicate at least one communication based on the at least one potential hazard. For example, communicating the at least one communication may include displaying an alert message to the worker, playing an audible alert message to the worker, generating a haptic alert (e.g., a vibration), displaying a prompt to the worker, any combination thereof, and/or the like. Additionally or alternatively, communicating the at least one communication may include communicating at least one message to remote computer system 140, communicating at least one message to a safety personnel computing device 150, any combination thereof, and/or the like.

In some non-limiting embodiments or aspects, remote computer system 140 may communicate at least one communication based on the at least one potential hazard. For example, communicating the at least one communication may include communicating at least one message (e.g., an alert message, a prompt, and/or the like) to wearable device 102 and/or mobile device 120, communicating at least one message (e.g., an alert message and/or the like) to a safety personnel computing device 150, any combination thereof, and/or the like.

In some non-limiting embodiments or aspects, remote computer system 140 may store the physiological data in database 142. Additionally or alternatively, remote computer system 140 may store potential hazard data associated with the potential hazard(s) in database 142.

In some non-limiting embodiments or aspects, remote computer system 140 may communicate at least one communication to safety personnel computing device 150 based on receiving the physiological data and/or detecting the potential hazard(s). In some non-limiting embodiments or aspects, safety personnel computing device 150 may display at least one graphical user interface based on the communication(s) (e.g., from remote computer system 140), as described herein. For example, the graphical user interface may include at least one of an alert message, location data associated with the potential hazard(s), at least one dashboard, any combination thereof, and/or the like. In some non-limiting embodiments or aspects, the dashboard(s) may include at least one of a gauge graphical element; a bar graphical element; textual information regarding the worker, the potential hazard(s) (e.g., a current hazard, a future hazard, and/or the like), any combination thereof, and/or the like. For example, the gauge graphical element(s) may include a plurality of gauge graphical elements comprising a first gauge graphical element associated with inherent risk of the at least one potential hazard, a second gauge graphical element associated with current risk of the at least one potential hazard, and a third gauge graphical element associated with future risk of the at least one potential hazard. Additionally or alternatively, the bar graphical element(s) may include a plurality of bar graphical elements comprising a first subset of bar graphical elements associated with worker data of the worker, a second subset of bar graphical elements associated with at least one current potential hazard of the at least one potential hazard, and a third subset of bar graphical elements associated with at least one future potential hazard of the at least one potential hazard.

Figure 2B:
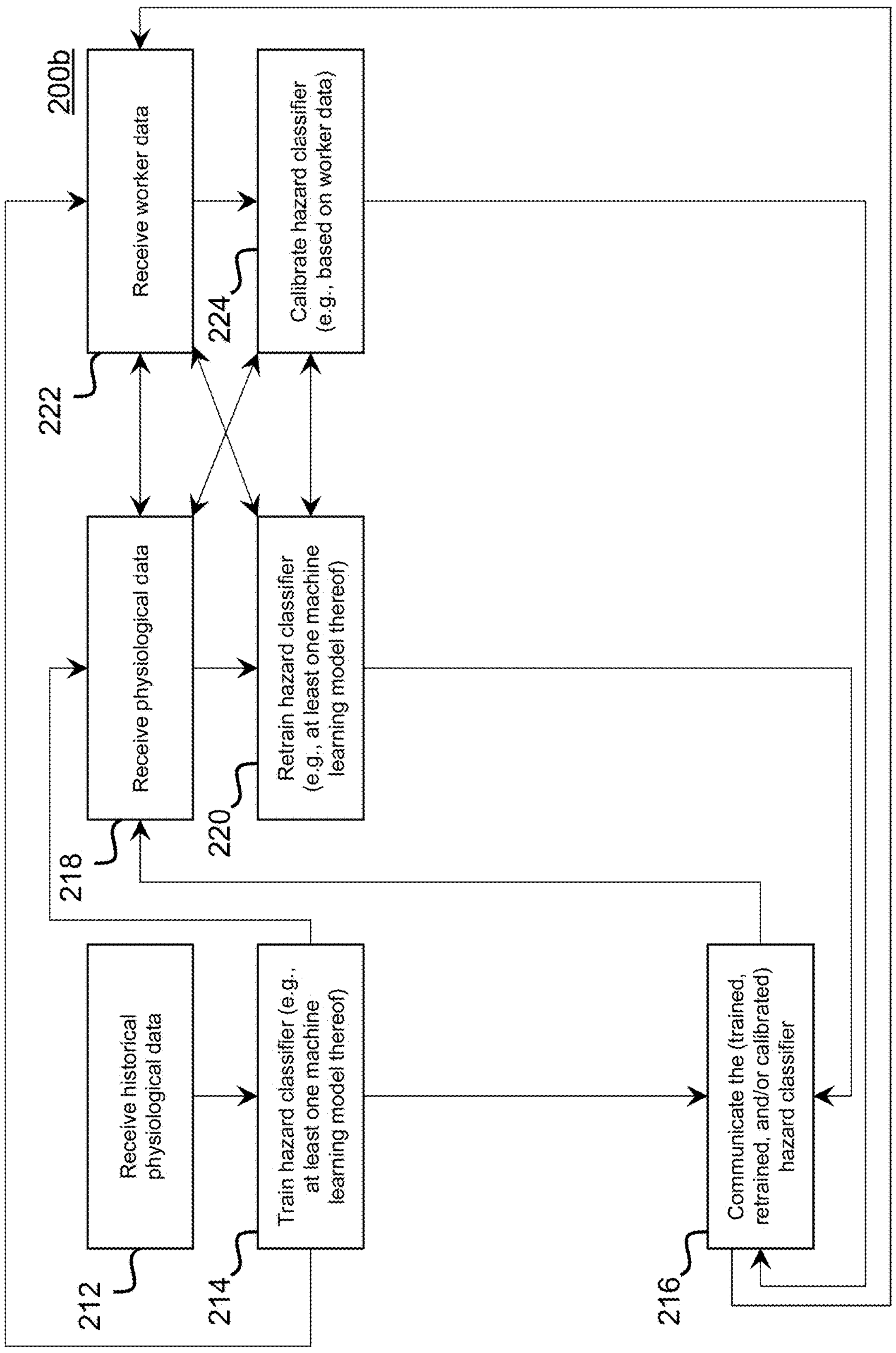

Referring now to FIG. 2B, shown is a process 200*b* for human-centered safety using physiological indicators to identify and/or predict potential hazards, according to some non-limiting embodiments or aspects. The steps shown in FIG. 2B are for example purposes only. It will be appreciated that additional, fewer, different, and/or a different order of steps may be used in non-limiting embodiments or aspects. In some non-limiting embodiments or aspects, one or more of the steps of process 200*b* may be performed (e.g., completely, partially, and/or the like) by remote computer system 140. In some non-limiting embodiments or aspects, one or more of the steps of process 200*b* may be performed (e.g., completely, partially, and/or the like) by another system, another device, another group of systems, or another group of devices, separate from or including remote computer system 140, such as wearable device 102, mobile device 120, safety personnel computing device 150, database 142, and/or the like.

As shown in FIG. 2B, at step 212, process 200*b* may include receiving historical physiological data. For example, remote computer system 140 may receive historical physiological data, as described herein.

In some non-limiting embodiments or aspects, database 142 may store the historical physiological data. Additionally, remote computer system 140 may receive (e.g., access, retrieve, and/or the like) the historical physiological data from database 142.

As shown in FIG. 2B, at step 214, process 200*b* may include training a hazard classifier. For example, remote computer system 140 may train a hazard classifier (e.g., at least one machine learning model thereof), as described herein.

In some non-limiting embodiments or aspects, remote computer system 140 may train the at least one machine learning model of the hazard classifier based on the historical physiological data, as described herein.

In some non-limiting embodiments or aspects, remote computer system 140 may train the hazard classifier (e.g., the machine learning model(s) thereof) by generating predicted potential hazards (e.g., a prediction, a classification, a confidence score, and/or the like) based on the historical physiological data (or a first subset thereof, e.g., a training subset). For example, the historical physiological data may include historical time-series data associated with the plurality of physiological parameters (e.g., the worker, of a plurality of workers, and/or the like), and remote computer system 140 may input the historical time-series data (e.g., of the training subset of the historical physiological data) into the hazard classifier to generate at least one predicted potential hazard (or the lack of such predicted potential hazard). The predicted potential hazard(s) may be compared (e.g., by the remote computer system 140) to labels (e.g., known potential hazards identified in the dataset, which may be provided by safety personnel and/or the like) for the respective portion of the historical time-series data. Remote computer system 140 may determine (e.g., calculate) a loss (e.g., error and/or the like) based on the predicted potential hazard(s) and the known potential hazard(s). For example, remote computer system 140 may calculate the loss based on the predicted potential hazard(s), the labels, and/or at least one loss function (e.g., an objective function, an error calculation, a prediction error, a contrastive loss, and/or the like). In some non-limiting embodiments or aspects, remote computer system 140 may update (e.g., adjust) the parameters (e.g., weights, connection values, and/or the like) of the hazard classifier (and/or machine learning models thereof) based on the loss (e.g., using back propagation, gradient calculations, and/or the like).

As shown in FIG. 2B, at step 216, process 200*b* may include communicating the hazard classifier. For example, remote computer system 140 may communicate the hazard classifier (e.g., to mobile device 120 and/or wearable device 102), as described herein.

In some non-limiting embodiments or aspects, remote computer system 140 may communicate the trained hazard classifier to mobile device 120 and/or wearable device 102. In some non-limiting embodiments or aspects, remote computer system 140 may communicate the retrained hazard classifier to mobile device 120 and/or wearable device 102. In some non-limiting embodiments or aspects, remote computer system 140 may communicate the calibrated hazard classifier to mobile device 120 and/or wearable device 102. In some non-limiting embodiments or aspects, remote computer system 140 may communicate the trained and calibrated hazard classifier to mobile device 120 and/or wearable device 102. In some non-limiting embodiments or aspects, remote computer system 140 may communicate the retrained and calibrated hazard classifier to mobile device 120 and/or wearable device 102.

As shown in FIG. 2B, at step 218, process 200*b* may include receiving physiological data. For example, remote computer system 140 may receive physiological data (e.g., from mobile device 120 and/or wearable device 102), as described herein.

In some non-limiting embodiments or aspects, remote computer system 140 may receive the physiological data associated with the worker from wearable device 102 and/or mobile device 120.

As shown in FIG. 2B, at step 220, process 200*b* may include retraining the hazard classifier. For example, remote computer system 140 may retrain the hazard classifier, as described herein.

In some non-limiting embodiments or aspects, remote computer system 140 may retrain the hazard classifier (e.g., the machine learning model(s) thereof) based on the physiological data. For example, retraining may be similar to training except at least some of the input data may be new and/or different (e.g., the physiological data associated with the worker received from wearable device 102 and/or mobile device 120 and/or the like). In some non-limiting embodiments or aspects, remote computer system 140 may communicate the (retrained) hazard classifier to mobile device 120 and/or wearable device 102.

As shown in FIG. 2B, at step 222, process 200*b* may include receiving worker data. For example, remote computer system 140 may receive (e.g., from wearable device 102, mobile device 120, database 142, and/or safety personnel computing device 150) worker data (e.g., associated with a particular worker wearing wearable device 102), as described herein.

As shown in FIG. 2B, at step 224, process 200*b* may include calibrating the hazard classifier. For example, remote computer system 140 may calibrate the hazard classifier (e.g., based on worker data), as described herein.

In some non-limiting embodiments or aspects, the hazard classifier may be calibrated based on the individual worker (e.g., worker data of the worker).

Figure 3:
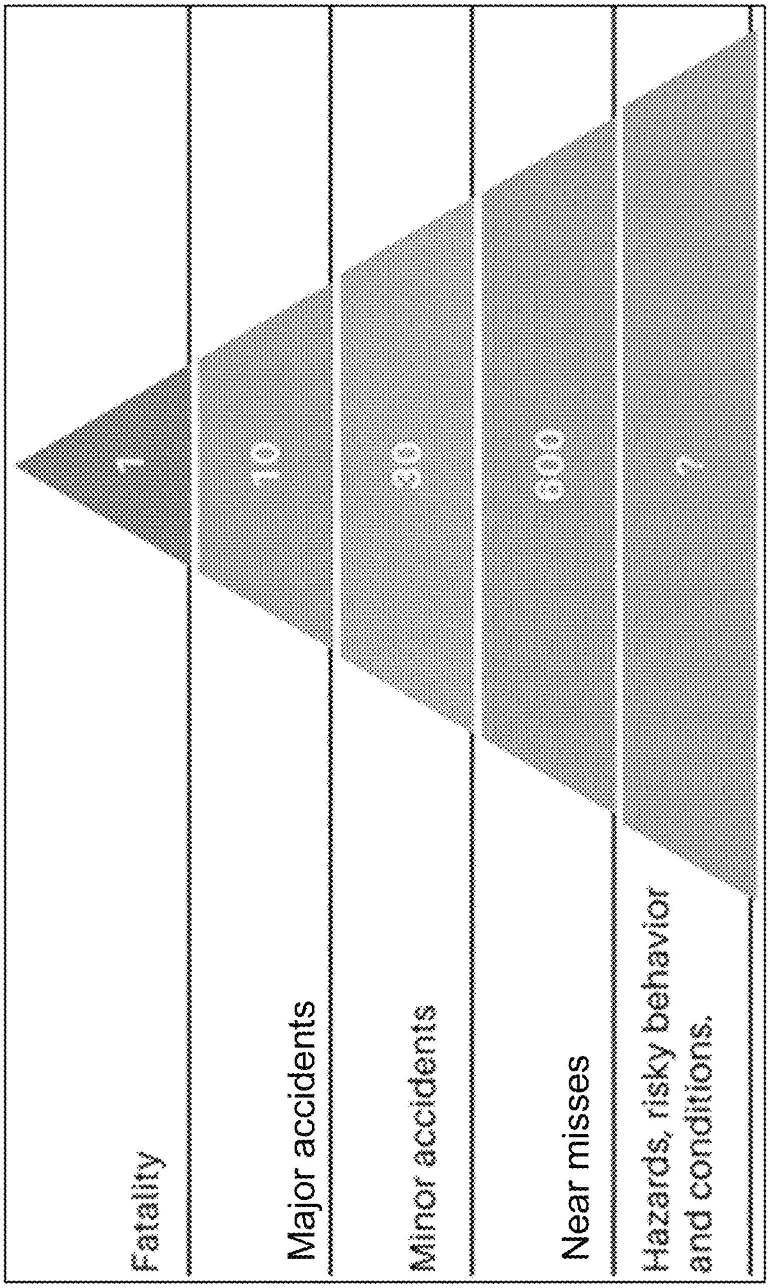
FIG. 3 is an example diagram of approximate relative frequency of hazardous conditions, near misses, minor accidents, major accidents, and fatalities, according to some non-limiting embodiments or aspects.

Referring now to FIG. 3, shown is an example diagram of approximate relative frequency of hazardous conditions, near misses, minor accidents, major accidents, and fatalities, according to some non-limiting embodiments or aspects.

As shown in FIG. 3, several less serious incidents tend to correlate with (e.g., precede, occur with relative frequency compared to, and/or the like) a more serious incident. For example, for every one fatality, there may be a small number (e.g., 10) of major accidents. For every small number of major accidents, there may be a larger number (e.g., 30) of minor accidents. For every such number of minor accidents, there may be an even larger number (e.g., 600) of near misses. For every such number of near misses, there may be a very large number of hazards, risky behaviors, and/or other conditions that fortuitously do not result in an accident or near miss.

Referring now to FIG. 4A, shown is a table of example causes of different types of safety incidents, according to some non-limiting embodiments or aspects. As shown in the table, different types of safety incidents are shown in the column on the left, and different example causes (e.g., of such safety incidents) are listed in the top row. Each "X" in the table indicates that the cause in the corresponding column may be associated with the type of safety incident in the corresponding row.

For example, transportation incidents may be associated with (e.g., caused at least in part by) at least one of fatigue, distraction, anger, impairment, unsafe conditions, unsafe actions by workers, a worker health issue, or any combination thereof. For example, trips, slips, and falls may be associated with (e.g., caused at least in part by) at least one of fatigue, distraction, impairment, unsafe conditions, unsafe actions by workers, a worker health issue, a harmful substance or gas, or any combination thereof. For example, violence and other injuries (e.g., caused by persons or animals) may be associated with (e.g., caused at least in part by) at least one of anger, impairment, unsafe actions by workers, or any combination thereof. For example, contact with objects and/or equipment may be associated with (e.g., caused at least in part by) at least one of distraction, impairment, unsafe conditions, unsafe actions by workers, or any combination thereof. For example, exposure to harmful substances and/or environment may be associated with (e.g., caused at least in part by) at least one of unsafe conditions, harmful substances or gases, or any combination thereof.

Referring now to FIG. 4B, shown are two tables of example physiological indicators associated with causes of different types of safety incidents, according to some non-limiting embodiments or aspects. As shown in each table, different causes (e.g., of safety incidents) are listed in the column on the left, and different example physiological indicators are listed in the top row. Each "X" in the table indicates that the physiological indicator in the corresponding column may be associated with the cause (e.g., of safety incidents) in the corresponding row.

In some non-limiting embodiments or aspects, the top table (e.g., labeled "PREVENTATIVE") may be associated with causes (e.g., of safety incidents) for which prevention may be desirable. In some non-limiting embodiments or aspects, as shown in the top table, example causes (e.g., of safety incidents) may include fatigue, distraction, anger, impairment, a worker health issue, and/or a harmful substance or gas.

In some non-limiting embodiments or aspects, the bottom table (e.g., labeled "CONTAINMENT") may be associated with causes (e.g., of safety incidents) for which containment may be desirable. In some non-limiting embodiments or aspects, as shown in the bottom table, example causes (e.g., of safety incidents) may include injury and/or unconsciousness.

In both tables, example physiological indicators may include heart rate, body temperature, blood pressure, galvanic skin response (e.g., sweat), cardiac arrhythmia, breathing rate, blood oxygen level, and/or gait.

Referring now to FIG. 5A, shown is a table of example physiological indicators and potential hazards, according to some non-limiting embodiments or aspects. As shown in FIG. 5A, example physiological indicators may include heart rate, body temperature, blood pressure, galvanic skin response (e.g., sweat), cardiac arrhythmia, breathing rate, blood oxygen level, and/or gait. Additionally, example potential hazards may be exposure to carbon monoxide ("CO") and/or low oxygen ("Low O2").

In some non-limiting embodiments or aspects, exposure to carbon monoxide may be associated with at least one of increased heart rate, no change in body temperature, decreased blood pressure, increased galvanic skin response (e.g., sweat), increased cardiac arrhythmias, increased breathing rate, decreased blood oxygen level, unsteady gait, and/or any combination thereof.

In some non-limiting embodiments or aspects, low oxygen may be associated with at least one of increased or decreased heart rate, decreased body temperature, increased or decreased blood pressure, increased galvanic skin response (e.g., sweat), increased cardiac arrhythmias, increased breathing rate, decreased blood oxygen level, unsteady gait, and/or any combination thereof.

Figure 5B:
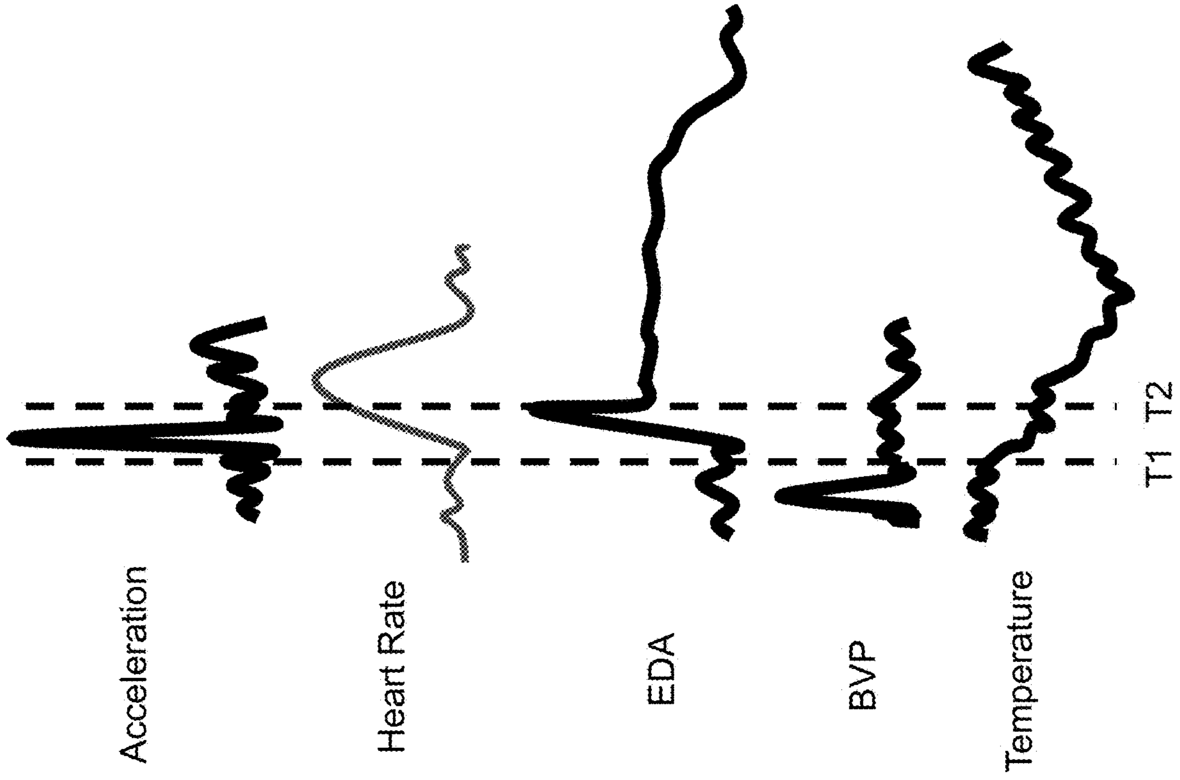
FIG. 5B includes waveforms of example physiological indicators of a potential hazard, according to some non-limiting embodiments or aspects.

Referring now to FIG. 5B, shown are waveforms of example physiological indicators of a potential hazard, according to some non-limiting embodiments or aspects. As shown in FIG. 5B, example physiological indicators may include acceleration, heart rate, electrodermal activity (EDA), blood volume pulse (BVP), and/or body temperature.

In some non-limiting embodiments or aspects, as shown in the time period between first time T1 and second time T2, a change in acceleration, change in heart rate, change in EDA, change in BVP, change in body temperature, and/or any combination thereof may be associated with a potential hazard (e.g., a trip).

Figure 6:
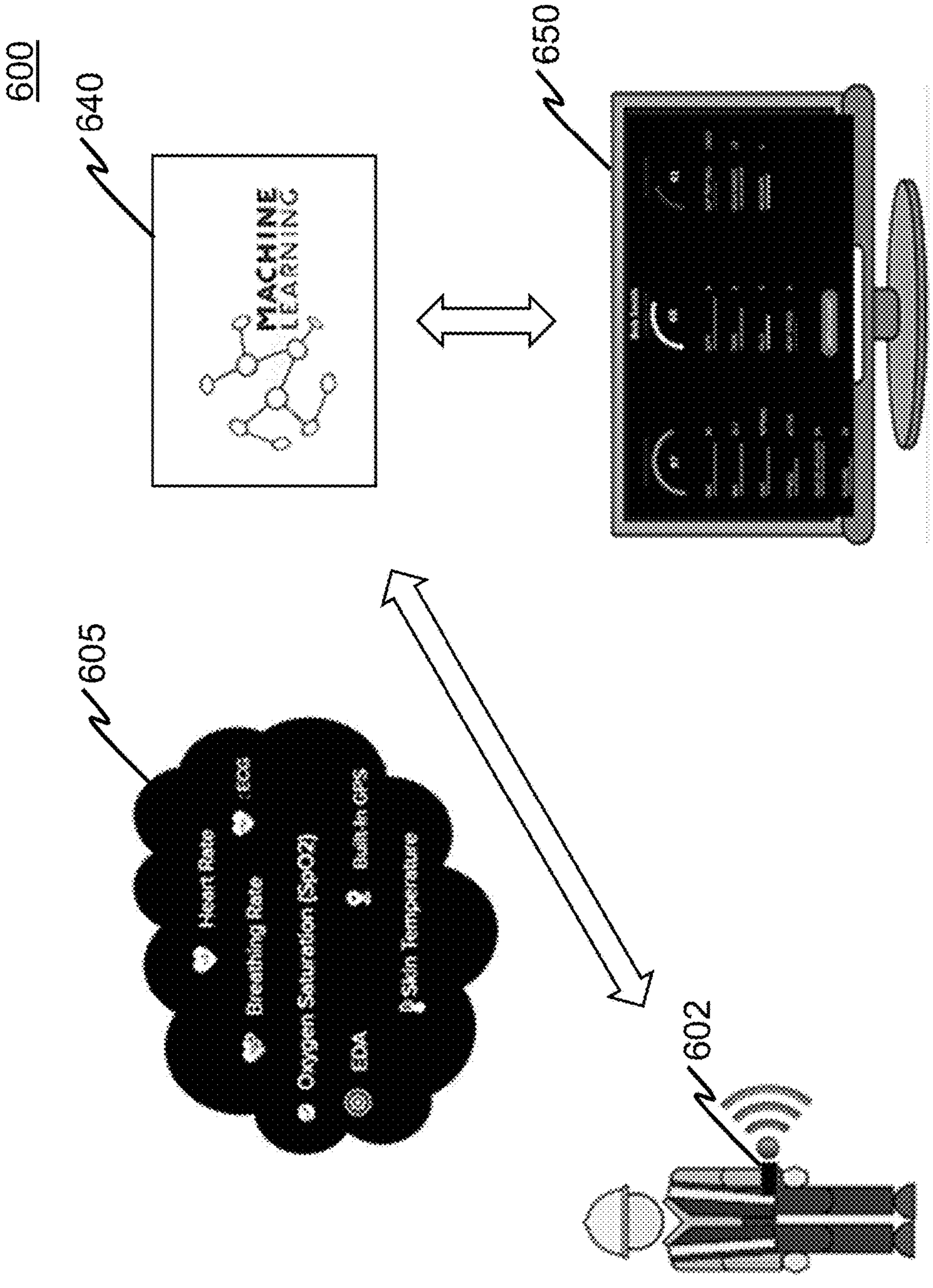
FIG. 6 is a schematic diagram of an example implementation of a system for human-centered safety using physiological indicators to identify and/or predict potential hazards, according to some non-limiting embodiments or aspects.

Referring now to FIG. 6, shown is a schematic diagram of an example implementation 600 of a system for human-centered safety using physiological indicators to identify and/or predict potential hazards, according to some non-limiting embodiments or aspects. For example, implementation 600 may include wearable device 602, physiological data 605, remote computer system 640, and/or safety personnel computing device 650. In some non-limiting embodiments or aspects, wearable device 602 may be the same as or similar to wearable device 102 and/or mobile device 120. In some non-limiting embodiments or aspects, remote computer system 640 may be the same as or similar to remote computer system 140. In some non-limiting embodiments or aspects, safety personnel computing device 650 may be the same as or similar to safety personnel computing device 150.

In some non-limiting embodiments or aspects, wearable device 602 may monitor physiological data 605 to detect at least one potential hazard based on a hazard classifier, as described herein. In some non-limiting embodiments or aspects, wearable device 602 may communicate at least one communication based on the at least one potential hazard, as described herein. For example, communicating the at least one communication may include displaying an alert message to the worker, playing an audible alert message to the worker, generating a haptic alert (e.g., a vibration), displaying a prompt to the worker, any combination thereof, and/or the like. Additionally or alternatively, communicating the at least one communication may include communicating at least one message to remote computer system 640, communicating at least one message to a safety personnel computing device 650, any combination thereof, and/or the like.

In some non-limiting embodiments or aspects, wearable device 602 may communicate physiological data 605 to remote computer system 640, as described herein. For example, wearable device 602 may continuously stream physiological data 605 to remote computer system 640. In some non-limiting embodiments or aspects, physiological data 605 may include raw sensor data, and wearable device 602 may communicate (e.g., continuously stream) the raw sensor data to remote computer system 640, which may allow for communicating such data without delay (e.g., compared to the delay introduced by determining derived physiological data before communicating derived physiological data). As such, the data communicated to and/or received by remote computer system 640 may be ensured to be as up-to-date and real-time as possible.

In some non-limiting embodiments or aspects, remote computer system 640 may receive physiological data (e.g., associated with a plurality of physiological parameters of the worker) from wearable device 602. In some non-limiting embodiments or aspects, remote computer system 640 may monitor the physiological data to detect at least one potential hazard based on a hazard classifier, as described herein. In some non-limiting embodiments or aspects, remote computer system 640 may communicate at least one communication based on the at least one potential hazard, as described herein. In some non-limiting embodiments or aspects, remote computer system 640 may train, retrain, and/or calibrate the hazard classifier (e.g., the machine learning model(s) thereof), as described herein, and/or remote computer system 640 may communicate the trained, retrained, and/or calibrated hazard classifier (e.g., to wearable device 602), as described herein.

In some non-limiting embodiments or aspects, remote computer system 640 may communicate at least one communication to safety personnel computing device 650 based on receiving the physiological data and/or detecting the potential hazard(s). In some non-limiting embodiments or aspects, safety personnel computing device 650 may display at least one graphical user interface based on the communication(s) (e.g., from remote computer system 640), as described herein.

Figure 7:
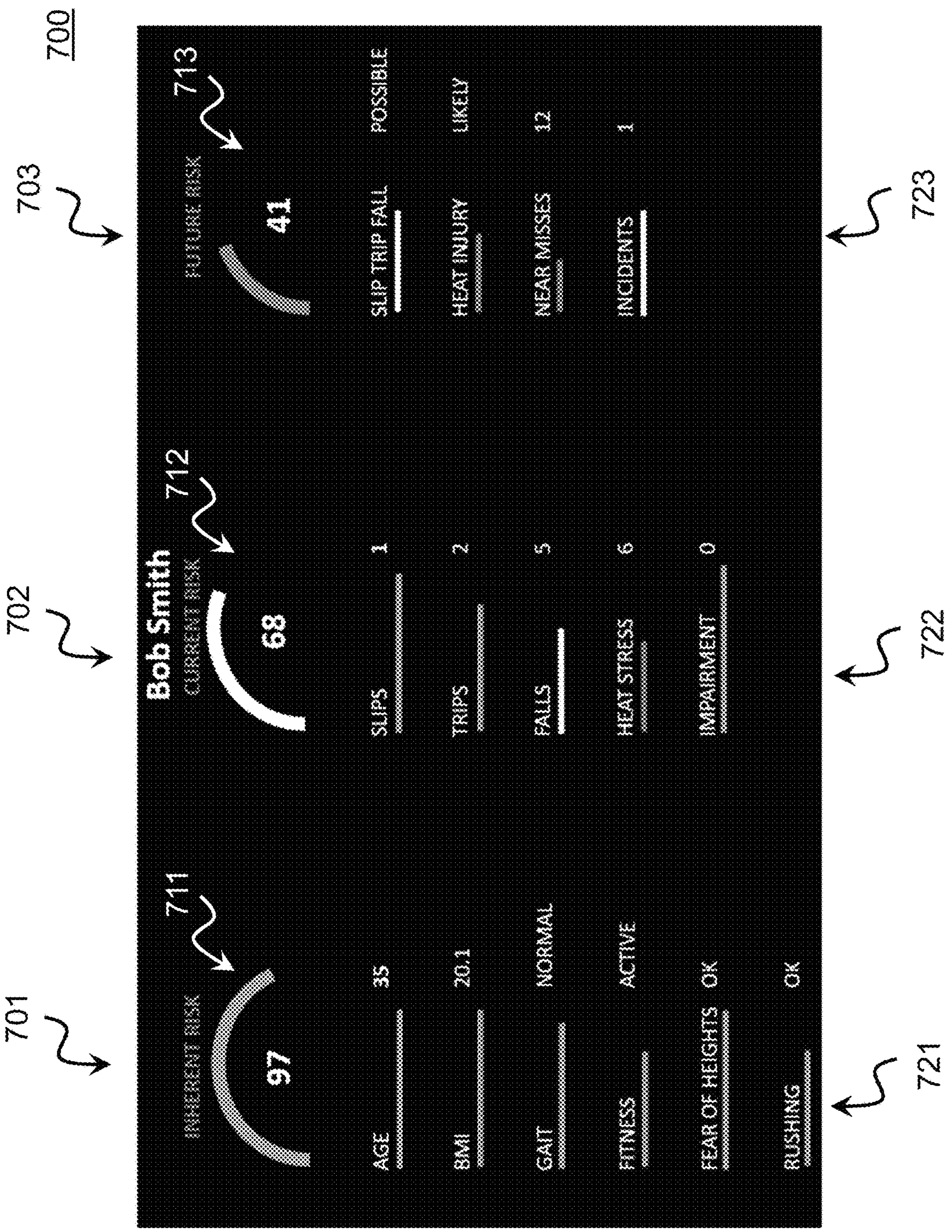
FIG. 7 is a diagram of an example graphical user interface according to an example implementation of the systems, methods, and computer program products for human-centered safety using physiological indicators to identify and/or predict potential hazards, according to some non-limiting embodiments or aspects.

Referring now to FIG. 7, shown is a diagram of an example graphical user interface 700 according to an example implementation of the systems, methods, and computer program products for human-centered safety using physiological indicators to identify and/or predict potential hazards, according to some non-limiting embodiments or aspects.

In some non-limiting embodiments or aspects, graphical user interface 700 may include a dashboard focused on a specific worker. For example, the worker's name (e.g., "Bob Smith") may be displayed as part of (e.g., at the top of) the dashboard.

In some non-limiting embodiments or aspects, graphical user interface 700 (e.g., the dashboard) may include at least one of a gauge graphical element (e.g., first gauge graphical element 711, second gauge graphical element 712, and/or third gauge graphical element 713), at least one bar graphical element (e.g., first subset of bar graphical elements 721, second subset of bar graphical elements 722, and/or third subset of bar graphical elements 723), textual information regarding the worker, textual information regarding at least one potential hazard (e.g., a current hazard, a future hazard, and/or the like), any combination thereof, and/or the like.

In some non-limiting embodiments or aspects, graphical user interface 700 (e.g., the dashboard) may include a first area 701 associated with inherent risk (e.g., of the worker), a second area 702 associated with current risk (e.g., risk of a current hazard), and a third area 703 associated with future risk (e.g., risk of a future hazard).

In some non-limiting embodiments or aspects, the gauge graphical element(s) may include first gauge graphical element 711 associated with inherent risk (e.g., an inherent risk score of the worker with respect to the potential hazard(s) and/or the like), a second gauge graphical element 712 associated with current risk of the potential hazard(s) (e.g., a current risk score associated with a risk of at least one current hazard), and/or a third gauge graphical element 713 associated with future risk of the potential hazard(s) (e.g., a future risk score associated with a risk of at least one future hazard). For example, first gauge graphical element 711 may be in first area 701, second gauge graphical element 712 may be in second area 702, and/or third gauge graphical element 713 may be in third area 703.

In some non-limiting embodiments or aspects, the bar graphical element(s) may include first subset of bar graphical elements 721 associated with worker data of the worker, second subset of bar graphical elements 722 associated with at least one current hazard, and/or a third subset of bar graphical elements 723 associated with at least one future hazard. For example, first subset of bar graphical elements 721 may be in first area 701, second subset of bar graphical elements 722 may be in second area 702, and/or third subset of bar graphical elements 723 may be in third area 703. In some non-limiting embodiments or aspects, each bar graphical element may be proximate to (e.g., below) textual information identifying the data represented by the bar graphical element.

In some non-limiting embodiments or aspects, the colors of the graphical element(s) (e.g., the gauge graphical elements and/or the bar graphical elements) may be adjusted based on the risk associated therewith. For example, green may indicate low risk, yellow may indicate medium risk, and/or red may indicate high risk.

In some non-limiting embodiments or aspects, risk score may be negatively correlated with the level of risk. For example, a high risk score may be associated with a low level of risk and a low risk score may be associated with a high level of risk.

Figure 8:
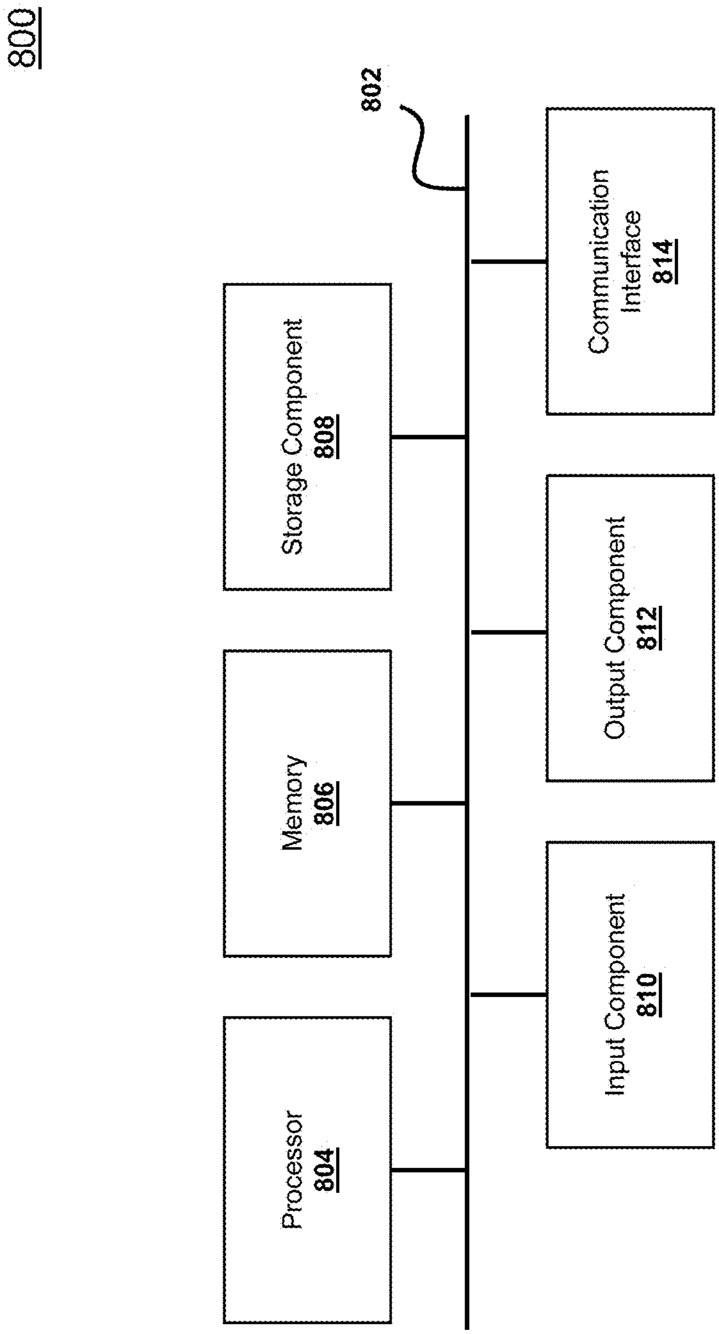
FIG. 8 is a diagram of example components of a computing device, according to non-limiting embodiments or aspects.

Referring now to FIG. 8, shown is a diagram of example components of a device 800, according to non-limiting embodiments or aspects. Device 800 may correspond to the wearable device 102, sensor 104, mobile device 120, remote computer system 140, database 142, and/or safety personnel computing device 150 in FIGS. 1A-1D, as an example. In some non-limiting embodiments or aspects, such systems or devices may include at least one device 800 and/or at least one component of device 800. The number and arrangement of components shown are provided as an example. In some non-limiting embodiments or aspects, device 800 may include additional components, fewer components, different components, or differently arranged components than those shown in FIG. 8. Additionally, or alternatively, a set of components (e.g., one or more components) of device 800 may perform one or more functions described as being performed by another set of components of device 800.

As shown in FIG. 8, device 800 may include a bus 802, a processor 804, memory 806, a storage component 808, an input component 810, an output component 812, and a communication interface 814. Bus 802 may include a component that permits communication among the components of device 800. In some non-limiting embodiments or aspects, processor 804 may be implemented in hardware, firmware, or a combination of hardware and software. For example, processor 804 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 806 may include random access memory (RAM), read only memory (ROM), and/or another type of dynamic or static storage device (e.g., flash memory, magnetic memory, optical memory, etc.) that stores information and/or instructions for use by processor 804.

With continued reference to FIG. 8, storage component 808 may store information and/or software related to the operation and use of device 800. For example, storage component 808 may include a hard disk (e.g., a magnetic disk, an optical disk, a magneto-optic disk, a solid state disk, etc.) and/or another type of computer-readable medium. Input component 810 may include a component that permits device 800 to receive information, such as via user input (e.g., a touch screen display, a keyboard, a keypad, a mouse, a button, a switch, a microphone, etc.). Additionally, or alternatively, input component 810 may include a sensor for sensing information (e.g., a global positioning system (GPS) component, an accelerometer, a gyroscope, an actuator, etc.). Output component 812 may include a component that provides output information from device 800 (e.g., a display, a speaker, one or more light-emitting diodes (LEDs), etc.). Communication interface 814 may include a transceiver-like component (e.g., a transceiver, a separate receiver and transmitter, etc.) that enables device 800 to communicate with other devices, such as via a wired connection, a wireless connection, or a combination of wired and wireless connections. Communication interface 814 may permit device 800 to receive information from another device and/or provide information to another device. For example, communication interface 814 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 800 may perform one or more processes described herein. Device 800 may perform these processes based on processor 804 executing software instructions stored by a computer-readable medium, such as memory 806 and/or storage component 808. A computer-readable medium may include any non-transitory memory device. A memory device includes memory space located inside of a single physical storage device or memory space spread across multiple physical storage devices. Software instructions may be read into memory 806 and/or storage component 808 from another computer-readable medium or from another device via communication interface 814. When executed, software instructions stored in memory 806 and/or storage component 808 may cause processor 804 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although embodiments have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

The invention claimed is:

1. A method for human-centered safety using physiological indicators to detect at least one potential hazard, comprising:

receiving, with at least one processor, physiological data associated with a plurality of physiological parameters of a worker from a wearable device of the worker;

monitoring, with the at least one processor, the physiological data to detect at least one potential hazard based on a hazard classifier, the hazard classifier comprising at least one machine learning model trained based on historical physiological data associated with the plurality of physiological parameters; and communicating, with the at least one processor, at least one communication based on the at least one potential hazard;

displaying, with the at least one processor, at least one dashboard, wherein the at least one dashboard comprises at least one of:

at least one gauge graphical element;

at least one bar graphical element; or any combination thereof, wherein the at least one gauge graphical element comprises a plurality of gauge graphical elements comprising a first gauge graphical element associated with inherent risk of the at least one potential hazard, a second gauge graphical element associated with current risk of the at least one potential hazard, and a third gauge graphical element associated with future risk of the at least one potential hazard, and wherein the at least one bar graphical element comprises a plurality of bar graphical elements comprising a first subset of bar graphical elements associated with worker data of the worker, a second subset of bar graphical elements associated with at least one current potential hazard of the at least one potential hazard, and a third subset of bar graphical elements associated with at least one future potential hazard of the at least one potential hazard.

2. The method of claim 1, wherein the plurality of physiological parameters comprise at least one of heart rate, body temperature, blood pressure, galvanic skin response, cardiac arrhythmia, breathing rate, blood oxygen level, gait, motion, body motion, limb motion, sounds, vibrations, a measurable quantity from the body of the worker, or any combination thereof, and wherein the physiological data comprises at least one of accelerometer data, blood volume pulse data, electrodermal activity data, body temperature data, gyroscope data, heart rate data, blood pressure data, galvanic skin response data, cardiac arrhythmia data, breathing rate data, blood oxygen level data, gait data, acoustic data, vibration data, sound data, motion data, body motion data, limb motion data, or any combination thereof.

3. The method of claim 1, wherein the wearable device comprises a plurality of sensors associated with the plurality of physiological parameters, and wherein the plurality of sensors comprise at least one of an accelerometer, a blood volume pulse sensor, an electrodermal activity sensor, a body temperature sensor, a gyroscope, a heart rate sensor, a blood pressure sensor, a galvanic skin response sensor, a cardiac arrhythmia sensor, a breathing rate sensor, a blood oxygen level sensor, a gait sensor, an acoustic sensor, a vibration sensor, a microphone, a motion sensor, or any combination thereof.

4. The method of claim 3, wherein the physiological data comprises raw sensor data from the plurality of sensors.

5. The method of claim 1, wherein the at least one machine learning model comprises at least one of a random forest model, a decision tree model, a neural network, a recurrent neural network, a long short-term memory model, an autoregressive integrated moving average, or any combination thereof.

6. The method of claim 1, wherein the hazard classifier comprises a plurality of machine learning models, each machine learning model of the plurality of machine learning models associated with a respective potential hazard of a plurality of potential hazards.

7. The method of claim 1, wherein the at least one potential hazard comprises at least one of a slip, a trip, a fall, heat stress, impairment, a hazardous substance, a hazardous environment, a distraction, violence, fatigue, contact with at least one object, a driving accident, a lack of oxygen, or any combination thereof.

8. The method of claim 1, wherein the at least one potential hazard comprises at least one of a current hazard, a future hazard, or any combination thereof.

9. The method of claim 1, wherein the wearable device comprises at least one of a wrist-wearable device, a torso-wearable device, a garment configured to be worn by the worker, or any combination thereof.

10. The method of claim 1, wherein communicating the at least one communication comprises at least one of displaying an alert message to the worker, playing an audible alert message to the worker, generating a haptic alert, displaying a prompt to the worker, communicating at least one message to a remote computer system, communicating at least one message to a safety personnel computing device, or any combination thereof.

11. The method of claim 1, wherein the at least one processor comprises at least one remote computer system processor of a remote computer system remote from the worker, wherein communicating the at least one communication comprises communicating an alert message to at least one of the wearable device, a safety personnel computing device, or any combination thereof.

12. The method of claim 1, wherein the at least one processor comprises at least one mobile device processor of a mobile device proximate to the worker, the method further comprising:

communicating, with the at least one mobile device processor, the physiological data to a remote computer system.

13. The method of claim 12, further comprising:

receiving, with the remote computer system, the historical physiological data;

training, with the remote computer system, the at least one machine learning model of the hazard classifier based on the historical physiological data; and communicating, with the remote computer system, the trained hazard classifier to the mobile device.

14. The method of claim 12, further comprising:

receiving, with the remote computer system, the physiological data.

15. The method of claim 14, further comprising:

retraining, with the remote computer system, the at least one machine learning model of the hazard classifier based on the physiological data; and communicating, with the remote computer system, the retrained hazard classifier to the mobile device.

16. The method of claim 14, further comprising:

communicating, with the remote computer system, at least one further communication to a safety personnel computing device based on receiving the physiological data.

17. The method of claim 16, further comprising:

displaying, with the safety personnel computing device, at least one graphical user interface based on the at least one further communication, wherein displaying the at least one graphical user interface comprises at least one of:

displaying an alert message;

displaying location data associated with the at least one potential hazard;

displaying the at least one dashboard; or any combination thereof.

18. A system for human-centered safety using physiological indicators to detect at least one potential hazard, comprising:

a wearable device configured to be worn by a worker, the wearable device comprising a plurality of sensors configured to sense a plurality of physiological parameters of the worker;

a remote computer system remote from the worker;

a mobile device proximate to the worker, the mobile device configured to:

receive physiological data associated with the plurality of physiological parameters of the worker from the wearable device;

communicate the physiological data to the remote computer system; and monitor the physiological data to detect at least one potential hazard based on a hazard classifier, the hazard classifier comprising at least one machine learning model trained based on historical physiological data associated with the plurality of physiological parameters; and a safety personnel computing device configured to display at least one dashboard, wherein the at least one dashboard comprises at least one of:

at least one gauge graphical element;

at least one bar graphical element; or any combination thereof, wherein the at least one gauge graphical element comprises a plurality of gauge graphical elements comprising a first gauge graphical element associated with inherent risk of the at least one potential hazard, a second gauge graphical element associated with current risk of the at least one potential hazard, and a third gauge graphical element associated with future risk of the at least one potential hazard, and wherein the at least one bar graphical element comprises a plurality of bar graphical elements comprising a first subset of bar graphical elements associated with worker data of the worker, a second subset of bar graphical elements associated with at least one current potential hazard of the at least one potential hazard, and a third subset of bar graphical elements associated with at least one future potential hazard of the at least one potential hazard.

19. A computer program product for human-centered safety using physiological indicators to detect at least one potential hazard, the computer program product comprising at least one non-transitory computer-readable medium including one or more instructions that, when executed by at least one processor, cause the at least one processor to:

receive physiological data associated with a plurality of physiological parameters of a worker from a wearable device of the worker;

monitor the physiological data to detect at least one potential hazard based on a hazard classifier, the hazard classifier comprising at least one machine learning model trained based on historical physiological data associated with the plurality of physiological parameters;

communicate at least one communication based on the at least one potential hazard;

display at least one dashboard, wherein the at least one dashboard comprises at least one of:

at least one gauge graphical element;

at least one bar graphical element; or any combination thereof, wherein the at least one gauge graphical element comprises a plurality of gauge graphical elements comprising a first gauge graphical element associated with inherent risk of the at least one potential hazard, a second gauge graphical element associated with current risk of the at least one potential hazard, and a third gauge graphical element associated with future risk of the at least one potential hazard, and wherein the at least one bar graphical element comprises a plurality of bar graphical elements comprising a first subset of bar graphical elements associated with worker data of the worker, a second subset of bar graphical elements associated with at least one current potential hazard of the at least one potential hazard, and a third subset of bar graphical elements associated with at least one future potential hazard of the at least one potential hazard.

* * * * *